United States Patent [19]
Ueda et al.

[11] Patent Number: 6,127,066
[45] Date of Patent: *Oct. 3, 2000

[54] HOLOGRAM RECORDING SHEET, HOLOGRAPHIC OPTICAL ELEMENT USING SAID SHEET, AND ITS PRODUCTION PROCESS

[75] Inventors: Kenji Ueda; Tsuyoshi Hotta; Yukio Taniguchi; Atsushi Sekiguchi; Hideyuki Iriyama, all of Tokyo, Japan

[73] Assignee: Dai Nippon Printing Co., Ltd., Shinjuku-ku, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/897,088

[22] Filed: Jul. 18, 1997

Related U.S. Application Data

[60] Continuation of application No. 08/459,663, Jun. 2, 1995, abandoned, which is a division of application No. 08/128,143, Sep. 29, 1993.

[30] Foreign Application Priority Data

Nov. 27, 1992 [JP] Japan ..................................... 4-318411
Nov. 27, 1992 [JP] Japan ..................................... 4-318412
Sep. 21, 1993 [JP] Japan ..................................... 5-234713

[51] Int. Cl.$^7$ ................................ G03H 1/04; G03H 1/30
[52] U.S. Cl. .................................... 430/1; 430/2; 359/25; 359/26
[58] Field of Search .............................. 759/3, 1, 22, 25, 759/26; 430/1, 2, 290

[56] References Cited

U.S. PATENT DOCUMENTS

| | | | |
|---|---|---|---|
| 2,698,794 | 1/1955 | Godowsky | 430/571 |
| 3,442,566 | 5/1969 | Forward et al. | 359/22 |
| 3,567,305 | 3/1971 | Collier et al. | 359/25 |
| 3,849,138 | 11/1974 | Wyckoff | 430/506 |
| 3,920,862 | 11/1975 | Damschroder et al. | 430/140 |
| 4,244,633 | 1/1981 | Kellie | 359/25 |
| 4,425,421 | 1/1984 | Rutges et al. | 430/238 |
| 4,455,061 | 6/1984 | Case | 359/22 |

(List continued on next page.)

FOREIGN PATENT DOCUMENTS

| | | | |
|---|---|---|---|
| 63-291082 | 11/1988 | Japan . | |
| 6421479 | 1/1989 | Japan . | |
| 1-107290 | 4/1989 | Japan . | |
| 3-280078 | 12/1991 | Japan | 359/22 |
| 3-295834 | 12/1991 | Japan . | |
| 4-275586 | 10/1992 | Japan | 359/22 |
| 5181399 | 7/1993 | Japan . | |

OTHER PUBLICATIONS

Jannson, J., et al., "Solar Control Tunable Lippmann Holowindows" Solar Energy Materials vol. 14, pp. 289–297, 1989.
Caulfield et al., "The Applications of Holography" © 1970 pp. 42–49.
Translation of JP 04–275586.
Translation of JP 01–107290.
Ogden et al. "multiplexing System for Holographic Projections." IBM Tech. Discl. vol. 12, No. 3 (Aug. 1969).

*Primary Examiner*—Martin Angebranndt
*Attorney, Agent, or Firm*—Sughrue, Mion, Zinn, Macpeak & Seas, PLLC

[57] ABSTRACT

The hologram recording sheet according to the invention is made up of a base film and hologram sensitive materials sensitive to different wavelength regions formed therein in a desired pattern, or a film and at least two hologram recording sensitive materials sensitive to different wavelength regions laminated on the film with a transparent plastic spacer layer located therebetween, thereby enabling the required diffraction light wavelengths to be recorded on the required sites without producing unnecessary interference fringes. At least two hologram recording sensitive materials sensitive to different wavelength regions are formed on different sites on a film in dotted or striped configuration, the size of which is up to 200 mm or at least twice as large as the thickness of the sensitive material layers, thereby enabling regions diffracting light of different wavelengths to be formed in the form of independent sets of interference fringes.

10 Claims, 29 Drawing Sheets

U.S. PATENT DOCUMENTS

| | | | |
|---|---|---|---|
| 4,569,898 | 2/1986 | Cottrell | 430/207 |
| 4,737,001 | 4/1988 | Moss | 359/22 |
| 4,737,488 | 4/1988 | Hochberg | 430/7 |
| 4,959,283 | 9/1990 | Smothers et al. | 430/1 |
| 5,011,244 | 4/1991 | Smith et al. | 359/22 |
| 5,162,929 | 11/1992 | Roddy et al. | 359/22 |
| 5,182,180 | 1/1993 | Gambogi, Jr. et al. | 359/3 |
| 5,186,533 | 2/1993 | Hori | 359/25 |
| 5,267,060 | 11/1993 | Colton | 359/22 |
| 5,282,066 | 1/1994 | Yu et al. | 430/2 |
| 5,477,347 | 12/1995 | Redfield et al. | 359/25 |

← Film feed direction
(top view)

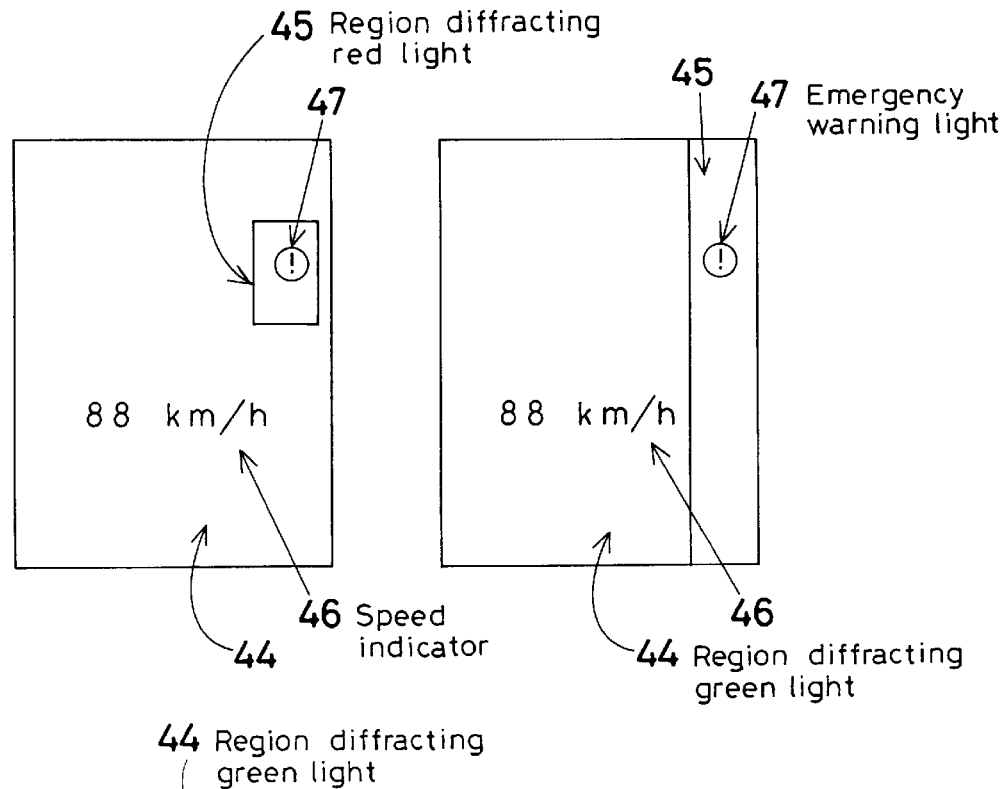
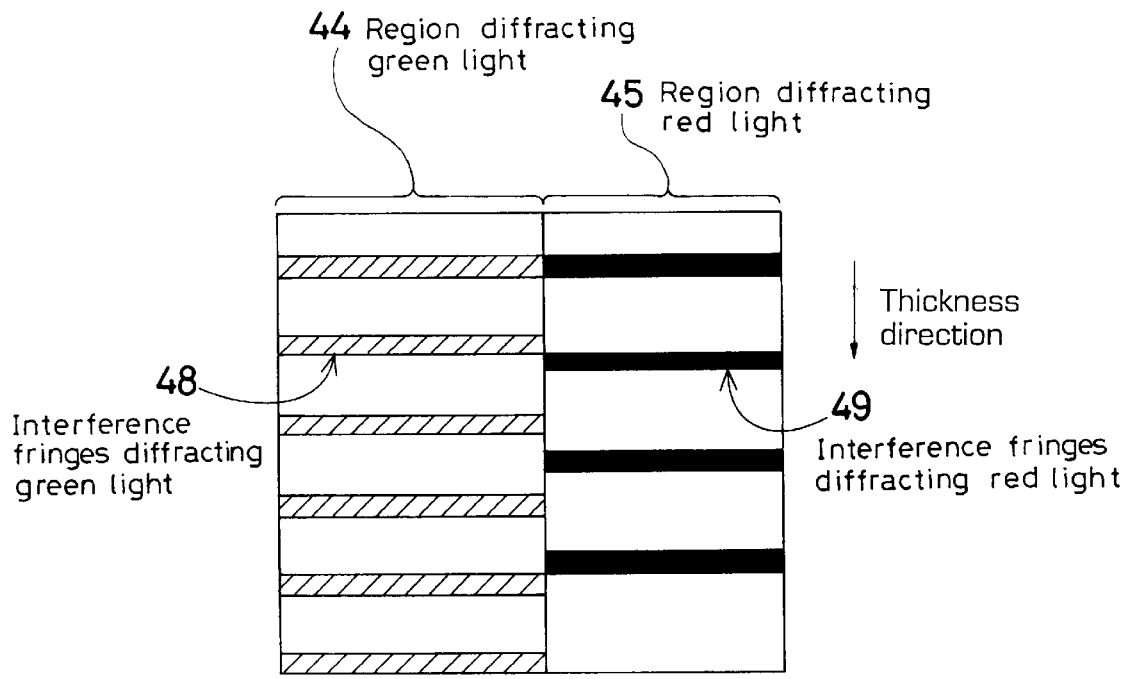

Grating

Pyramid

Matched

FIG. 20(a)

| R | G | B | R | G | B | R | G |
|---|---|---|---|---|---|---|---|
| G | B | R | G | B | R | G | B |
| B | R | G | B | R | G | B | R |
| R | G | B | R | G | B | R | G |
| G | B | R | G | B | R | G | B |
| B | R | G | B | R | G | B | R |
| R | G | B | R | G | B | R | G |
| G | B | R | G | B | R | G | B |

(top view)

R: Hologram sensitive material (sensitive to red)

G: Hologram sensitive material (sensitive to green)

B: Hologram sensitive material (sensitive to blue)

| G | B | R | G | B | R | G | B |

↑ Thickness direction

← Planar direction

FIG. 20(b)

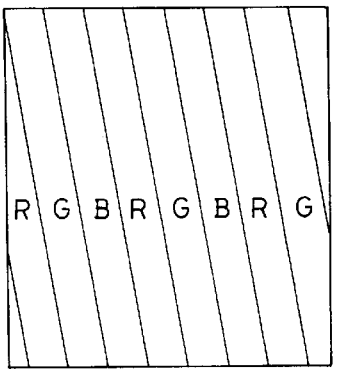

(top view)

| R | G | B | R | G | B | R | G |

↑ Thickness direction

← Planar direction

FIG. 20(c)

Upper   B
Middle  G
Lower   R (top view)

↑ Thickness direction

| B |
|---|
| G |
| R |

Thickness direction

Planar direction

FIG. 34(a)
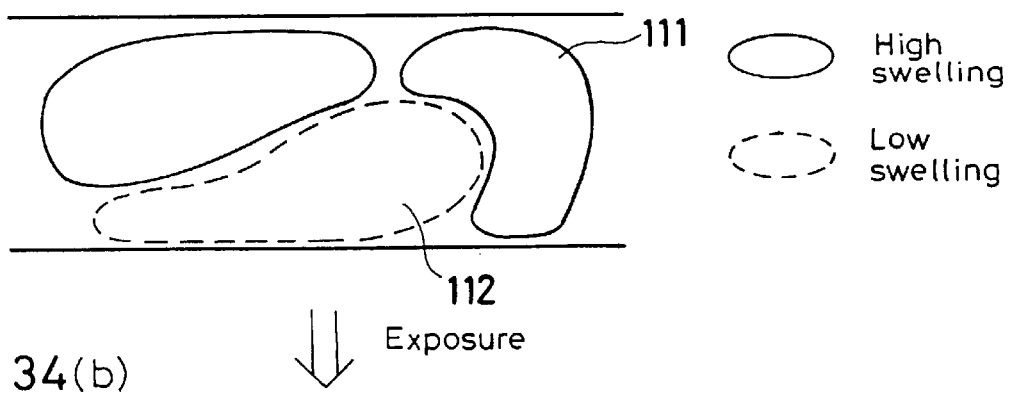
FIG. 34(b) ⇓ Exposure
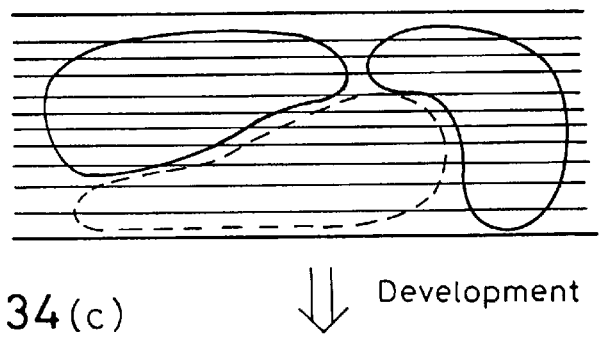
FIG. 34(c) ⇓ Development
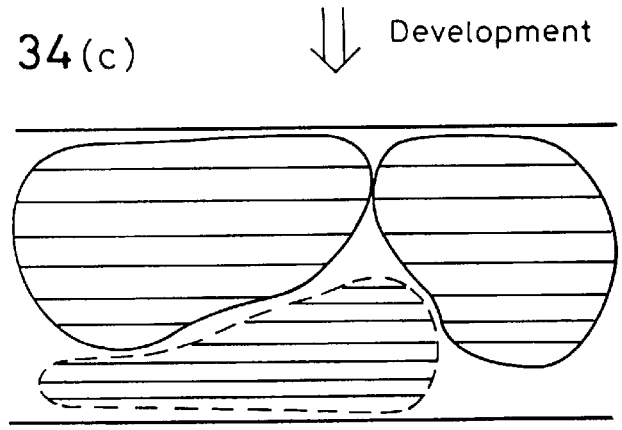

141: Photosensitive material
142: Laser light

141: Photosensitive material
142: Laser light
143: Mirror

141: Photosensitive material
142: Laser light
143: Mirror
144: Glass block
145: Matching solution

HOLOGRAM RECORDING SHEET, HOLOGRAPHIC OPTICAL ELEMENT USING SAID SHEET, AND ITS PRODUCTION PROCESS

This is a Continuation of application Ser. No. 08/459,663 filed Jun. 2, 1995 now abandoned, which is a divisional of application Ser. No. 08/128,143 filed Sep. 29, 1993.

BACKGROUND OF THE INVENTION

The present invention relates to a hologram recording sheet suitable for multicolor displays which is required to selectively diffract light of two or more wavelengths, to a holographic optical element such as a multicolor head-up display combiner, a multicolor display hologram, a heat-wave reflecting film that is effectively used on the windows of a car or building, a broad band of holographic filter, and a diffraction grating which, like the heat-wave reflecting film, diffracts light in a wide wavelength range, and to a process for producing such a holographic optical element.

So far, hologram sensitive materials have been widely used for holograms for ornamental, forgery-preventing, optical element or other purposes. Usually, a typical hologram sensitive material is made up of a PET substrate on which a hologram sensitive material 2 sensitive to green and red light is uniformly coated in the form of a single layer, as can be seen from FIG. 1. This arrangement is applied to a hologram optical element required to selectively reflect or diffract light of two or more wavelengths, esp., to a head-up display combiner designed to change color from site to site. In a typical combiner, a hologram sensitive material capable of diffracting light of plural wavelengths is produced on the entire surface thereof, thereby enabling all colors to be displayed.

In the conventional arrangement in which a hologram capable of displaying all colors is provided on the entire surface of the combiner, there is need of diffracting a plurality of light rays having different wavelengths. As shown in FIG. 2 by way of example, plural sets of interference fringes such as interference fringes 4 that diffract green light and interference fringes 5 that diffract red light must be produced in the thickness direction of the hologram. However, not only does this give rise to technical difficulties but also imposes some considerable limitation on the hologram recording material to be used. In addition, this is responsible for inferior image quality such as ghost images.

One possible approach to solving this problem is the lamination of hologram sensitive materials sensitive to different wavelength regions. However, high coating technologies such as slide coating, slot coating and curtain coating are needed for the uniform lamination of many hologram sensitive materials with their interfaces kept constant, and much time is taken to predetermine the required conditions, etc. At the same time, this approach has a cost problem, because there is need of using an exclusive fountain head. Another approach is to use a so-called dry type of hologram recording material recently put forward by Du Pont or Government Industrial Research Institute, Osaka, which is designed to record interference fringes by the migration of the monomer contained therein. However, a grave problem with this is that the unrestricted migration of the monomer takes place through the interfaces; in other words, the pitch of the interference fringes cannot be obtained, as designed, although depending on what type of hologram-recording process is used. Notice that this is quite true when reliance is on sequential exposure.

On the other hand, attention is now paid to a multicolor display hologram having excellent effects on ornamentation and preventing forgery and a volume phase (Lippmann) type of hologram excellent in wavelength selectivity and having a profusion of three dimensional depth. A hologram combiner is one of such optical elements, and functions as a semi-transmitting image-formation element. FIG. 3(a) is a schematic that illustrates how to make a hologram of the image. Light from a laser 10 is split by a half-mirror 11 into two light beams, one traveling to one point of a lens 12, where it is converted to divergent rays and the other propagating to one point of a lens 13, where it is converted to divergent rays. These two light rays are incident on both sides of a volume phase type of hologram recording material 14, for instance, a photopolymer, so that they can interfere as a Lippmann hologram. This is a hologram combiner.

As shown in FIG. 3(b), such a hologram combiner 16 diffracts light leaving a display object 15 located in the vicinity of one divergent point for image-taking in the reflection direction, so that the diffracted image can emerge as if they came from a display object 15' located in the vicinity of the other divergent point for image-taking. The image-formation magnification and the image position are determined by the relative distances L and L between the divergent point for image-taking and the recording material. Hence, this hologram combiner functions to diffract only the light of the wavelength for recording or a wavelength having a specific relation thereto and transmit light of other wavelength, so that the image superposition or synthesis can be achieved. The optical elements represented by such a hologram combiner include a head-up display combiner.

Optical systems for recording and reconstructing various color display holograms will now be explained with reference to FIGS. 4 to 6.

FIG. 4 is a schematic of an optical system for recording and reconstructing a laser light reconstructing hologram. As shown in FIG. 4(a), a sensitive material 21 is trebly exposed to light at sequentially varying wavelengths R→G→B, so that light from an object 20 and reference light can interfere on a recording material 21 to record interference fringes. For reconstruction, the hologram 21 is illuminated by mixed (R+G+B) light from the same direction as the reference light, as shown in FIG. 4(b), so that the color hologram image of the object 20 can be observed at the original position.

FIG. 5 is a schematic representing an optical system for recording and reconstructing a rainbow hologram. At the first stage, light from an object 20 and reference light interfere on three sensitive materials 21 at sequentially varying recording wavelengths R→G→B, so that three first holograms for R, G and B can be produced, as shown in FIG. 5(a). At the second stage, the first holograms are illuminated by light on the wave fronts conjugate to the reference waves, so that a real image of the object is reproduced at the original object position. Then, while a second sensitive material 23 is located at the position where the real image is reproduced and a slit is placed just in front of the first holograms, thereby keeping transverse parallax intact and eliminating longitudinal parallax, treble exposure is carried out at varying recording wavelengths R→G→B and with varying three first holograms for R, G and B, so that a second hologram is produced by interference with the reference light, as shown in FIG. 5(b). Upon reconstruction by white light on the wave fronts conjugate to the reference waves, an image having a profusion of three dimensional depth is produced in the lengthwise direction of the slit. If the observer's viewing position is moved vertically to this, the reconstructed image in different color can then be observed, as shown in FIG. 5c.

FIG. 6 is a schematic representing an optical system for recording and reconstructing a Lippmann hologram. At the first stage, three first holograms for R, G and B are produced as in the case of the rainbow hologram (see FIG. 6(a)). At the second stage, a second sensitive material 23 is located at the position of the first hologram where a real image is reproduced, and is then illuminated by reference light from the opposite direction for treble exposure at varying recording wavelengths R→G→B, thereby producing a second hologram, as shown in FIG. 6(b). Upon reconstruction by the illumination of the second hologram by the reference light and white light from the opposite direction, a color image is reproduced by the reflected and diffracted light, as shown in FIG. 6(c).

In addition, a surface relief type of hologram can be produced by copying a mold having surface asperities in the form of interference fringes.

To achieve displays in multicolor by the conventional method, plural sets of interference fringes such as interference fringes 30 diffracting blue light, interference fringes 31 diffracting green light and interference fringes 32 diffracting red light must be superposed on the same hologram in the thickness direction in the case of a Lippmann hologram, as shown in FIG. 7(a). In the case of laser light reconstructing and rainbow holograms, or "transmission holograms", plural sets of interference fringes such as interference fringes 30 diffracting blue light, interference fringes 31 diffracting green light and interference fringes 32 diffracting red light must be similarly formed, as shown in FIG. 7(b). Not only does this give rise to technical difficulties, but also places some considerable limitation on the hologram recording material to be used, because the sensitive material is required to be sensitive to plural colors. There is also a diffraction efficiency drop. Moreover, this is responsible for inferior image quality such as large noises, for instance, ghost images.

So far, heat-wave reflecting films have been put on the windows of cars or buildings so as to control a rise in the inside temperature. A typical conventional heat-wave reflecting film has its surface designed to reflect heat waves in a preset wavelength range. To reflect heat waves of wavelength longer than the preset wavelength, there is need of adding to each site of the film surface a function capable of reflecting heat waves in a desired wavelength region. This has heretofore been achieved by using a dielectric material and a metal or metal oxide thin film, etc.

However, conventional heat-wave reflecting films such as deposited films, except holograms, when used to reflect heat waves in a wide wavelength range, result unavoidably in a lowering of the transmission of visible light, because they are likely to reflect or absorb visible light. Diffraction gratings, although they may somehow be used as heat-wave reflecting films, will make it difficult to reflect heat waves in a wide wavelength range due to their wavelength selectivity. This problem may possibly be solved by superposing layers diffracting different wavelength regions in the film thickness direction. However, a problem with this superposition is that the light diffracted by one layer is further diffracted by another layer, thus making it very difficult to achieve any effective reflection of heat waves.

When interference fringes of a given pitch are recorded on a photosensitive material, the diffraction efficiency shows a peak with respect to the wavelength determined by that pitch. Hence, a photosensitive material with interference fringes of a certain pitch recorded thereon can be used as an optical filter, because its reflectivity with respect to light of a given wavelength can be increased. So far, this has been extended to a heat-wave reflecting film having increased reflection properties with respect to the infrared region, for instance. Also, methods of disturbing interference fringes by material treatments, thereby making the band width of the reflection wavelength region wider, have been put forward.

However, it is extremely difficult to produce a wide band width of fiter such as a solar reflector with the use of a diffracting grating with interference fringes recorded thereon. In particular, a grave problem with widening band width by conventional material treatments is that it is extremely difficult to regulate the reflection wavelength region to a specific region.

One of well-known diffraction gratings is a volume hologram produced by recording interference fringes on a film made up of photopolymer, dichromated gelatin, silver salt or the like by interference of light. However, this volume hologram has a narrow diffraction wavelength range; no volume hologram having a wide wavelength range is available as yet. Such a diffraction grating, when used in the form of a heat-wave reflecting film or the like, is required to have a diffraction wavelength range of at least a few 100 nm.

SUMMARY OF THE INVENTION

An object of the invention is to provide a hologram recording sheet which enables an image of good quality to be obtained and, at the same time, hologram recording to be easily made at an advantageous cost.

Another object of the invention is to provide a hologram recording sheet that can be used to make the pitch of interference fringes, as designed, either by simultaneous exposure or by sequential exposure.

A further object of the invention is to provide a hologram recording sheet which enables an image of good quality to be displayed in multicolor.

A still further object of the invention is to provide a hologram combiner or display hologram which enables an image of good quality to be displayed in multicolor.

A still further object of the invention is to provide a heat-wave reflecting film which can reflect heat wave wavelengths in a wide wavelength region and can prevent any reduction in the transmission of visible light, and a method for producing it.

A still further object of the invention is to provide a holographic filter which can easily achieve a broad band of filter characteristics, and a method for producing it.

A still further object of the invention is to provide a volume hologram type of diffraction grating using a photopolymer, which has a broader range of diffraction wavelengths.

The invention is characterized by providing a hologram recording sheet in which at least two hologram materials sensitive to different wavelength regions are formed on different regions on a film in a given pattern, whereby, using laser light of a specific wavelength as a hologram recording light source, the regions diffracting light of different wavelengths can be recorded on the same plane in the form of sets of interference fringes that are independent in the thickness direction of the photosensitive material.

Also, the invention is characterized by providing a hologram recording sheet in which at least two hologram recording materials sensitive to different wavelength regions are laminated on a film through a transparent plastic spacer layer, whereby, using laser light of a specific wavelength as a hologram recording light source, a plurality of regions diffracting different wavelengths can be recorded on the same plane either by simultaneous exposure or by sequential exposure.

Further, the invention is characterized by providing a hologram recording sheet in which at least two hologram recording materials sensitive to different wavelength regions are formed on different regions on a film in dotted or striped configuration of up to 200 µm or less in size, whereby, using laser light of a specific wavelength as a hologram recording light source, the zones diffracting light of different wavelengths can be formed on the same plane in the form of sets of interference fringes that are independent in the thickness direction of the photosensitive materials.

Still further, the invention is characterized by providing a hologram recording sheet in which at least two hologram recording materials sensitive to different wavelength regions are formed on different regions on a film in dotted or striped configuration that is at least twice as large as the thickness of the photosensitive materials, whereby, using laser light of a specific wavelength as a hologram recording light source, the regions diffracting light of different wavelengths can be formed on the same plane in the form of sets of interference fringes that are independent in the thickness direction of the photosensitive materials.

Still further, the invention is characterized by providing a hologram combiner or display hologram which is produced using a hologram recording sheet in which at least two hologram recording materials sensitive to different wavelength regions are formed on different zones on a film in dotted or striped configuration of up to 200 µm or less in size.

Still further, the invention is characterized by providing a heat-wave reflecting film in which diffraction gratings reflecting heat waves in different wavelength regions are formed on a surface in mosaic configuration, thereby enabling a wide wavelength range of heat waves to be reflected.

Still further, the invention provides a holographic filter with interference fringes recorded thereon, characterized in that sets of interference fringes of a plurality of different pitches are recorded.

Still further, the invention provides a method for producing a holographic filter by recording interference fringes, characterized in that sets of interference fringes are recorded with a plurality of light beams different from each other in terms of the direction of incidence on a photosensitive material, or in that sets of interference fringes are recorded with a plurality of light beams varying continuously in terms of the direction of incidence on a photosensitive material.

Still further, the invention provides a diffraction grating made up of a distributed index type of interference fringes recorded on a photopolymer, characterized in that the binder polymer used comprises a mixture of a plurality of polymers different from each other in terms of the swelling properties with respect to a developer.

Still further, the invention provides a method for producing a diffraction grating made up of a distributed index type of interference fringes recorded on a photopolymer, characterized by recording sets of interference fringes on a recording material obtained by dispersing a reactive monomer and a photopolymerization initiator in a binder polymer comprising a mixture of a plurality of polymers different from each other in terms of the swelling properties with respect to a developer, and then developing the recording material with a developer in which a reactive monomer different from the reactive monomer in the recording material is dissolved.

Still further, the invention is characterized in that light is allowed to be diagonally incident on both sides of a photosensitive material made up of a plurality of hologram sensitive material layers with different indices of refraction in the thickness direction, thereby producing sets of interference fringes substantially parallel with each layer.

Still further, the invention is characterized in that light is allowed to be diagonally incident on one side of the photosensitive material while a reflecting mirror is located on the other side thereof, thereby recording sets of interference fringes.

Still further, the invention provides a method for producing a diffraction grating having a plurality of interference fringes of different pitches recorded thereon, characterized in that sets of interference fringes are recorded on the a photosensitive material by multiple interference exposure using a plurality of light beams of different wavelengths.

BRIEF DESCRIPTION OF THE DRAWINGS

FIG. 9 is a projection schematic of a head-up display combiner.

FIG. 10 is an imaginary schematic of interference fringes in a hologram recording sheet for multicolor recording purposes according to the invention.

FIG. 20 is a schematic of a hologram combiner or display hologram.

FIG. 34 is a schematic of an example of mixing different swelling photopolymers, thereby making the diffraction wavelength region wide.

DESCRIPTION OF THE PREFERRED EMBODIMENT

Figure 1:
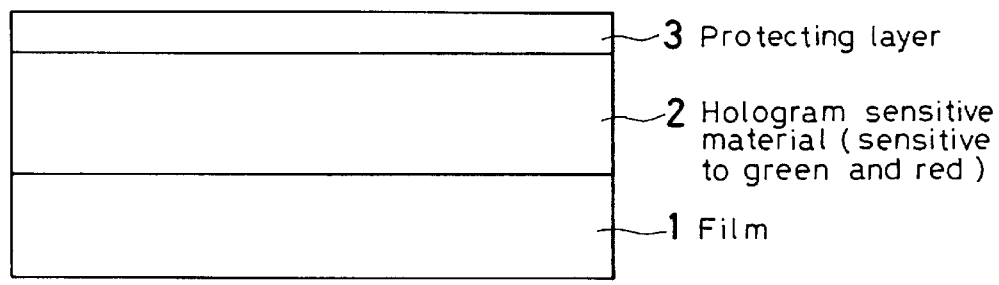
FIG. 1 is a schematic of a conventional hologram sensitive material.
Figure 2:
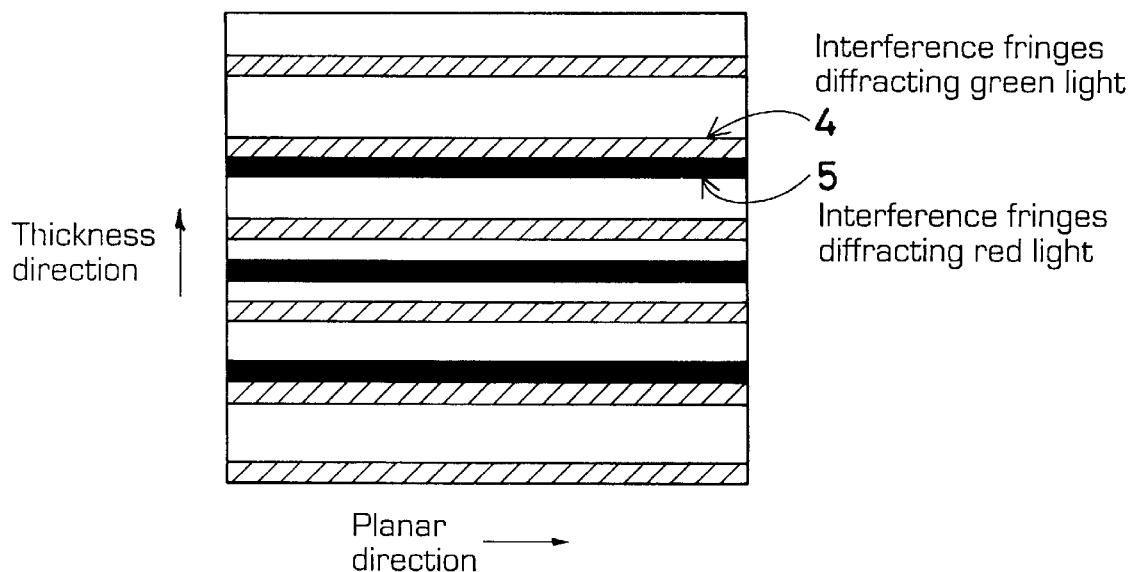
FIG. 2 is a schematic of a conventional color hologram.
Figure 3A:
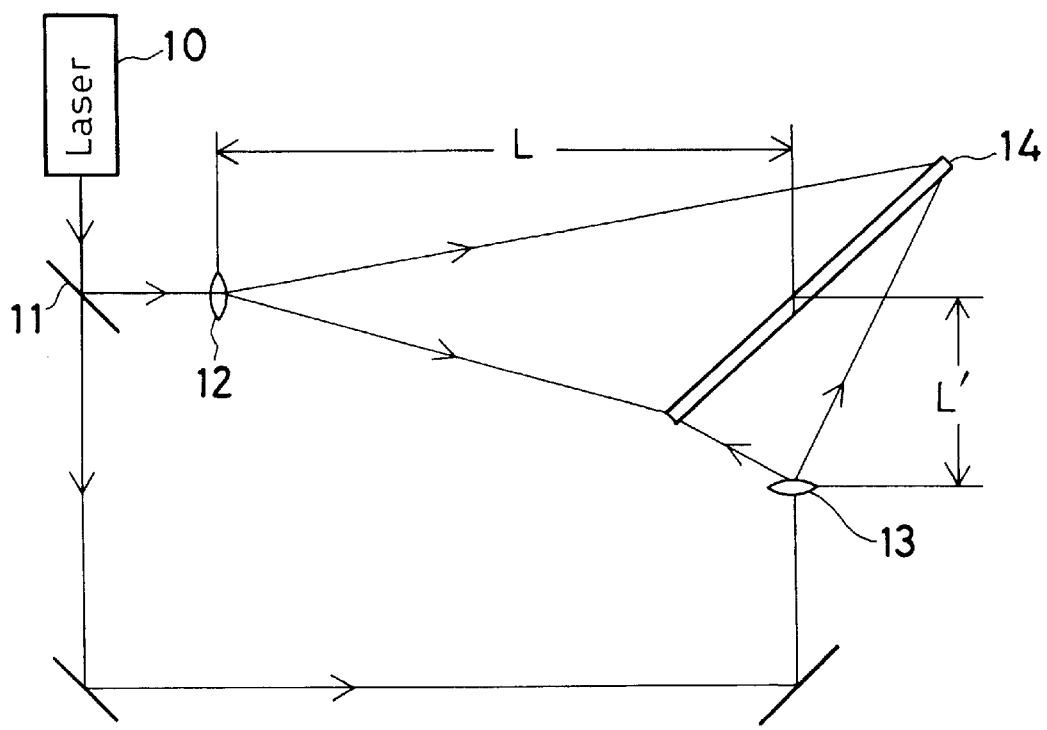
FIG. 3 is a schematic of a hologram recording and reconstructing optical system.
Figure 3B:
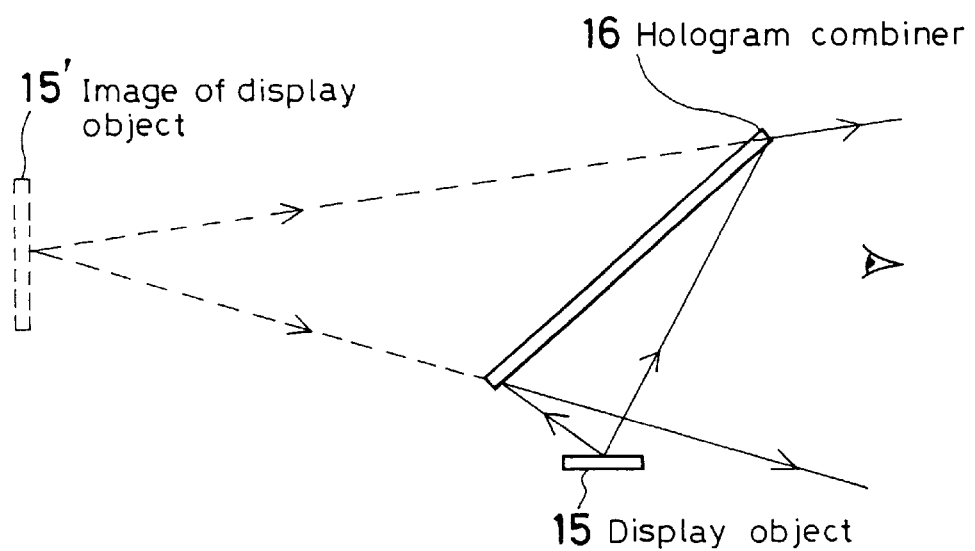
Figure 4A:
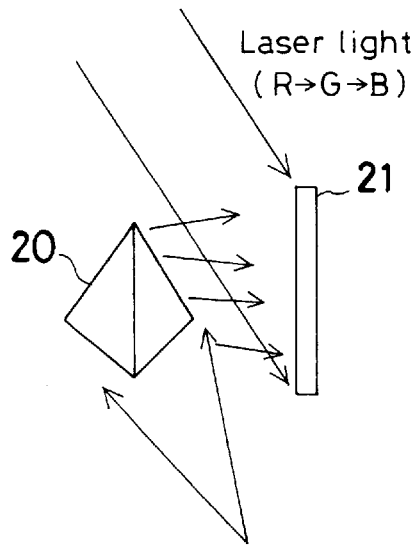
FIG. 4 is a schematic of an optical system for recording and reconstructing a laser light-reconstructing hologram.
Figure 4B:
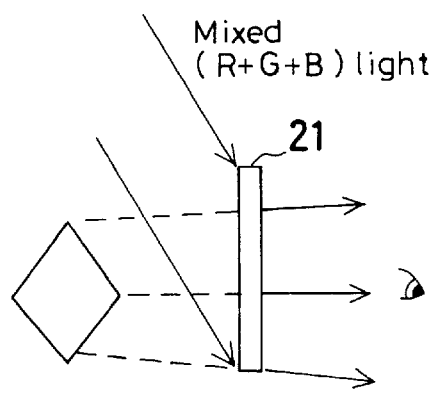

One embodiment of the hologram recording sheet according to the invention will be explained with reference to FIGS. 8 to 11, wherein reference numeral 41 stands for film, 42 a hologram sensitive material (sensitive to green), 43 a hologram sensitive material (sensitive to red), 44 a zone that diffracts green light, 45 a zone that diffracts red light, 46 a display object to be projected in green (that is shown in the form of a speed indicator), 47 a display object to be projected in red (that is shown in the form of an emergency warning light), 48 interference fringes that diffract green light, 49 interference fringes that diffract red light, and 50 a protecting layer.

In the hologram recording sheet according to this embodiment the hologram sensitive materials 42 and 43 are formed on the film 41 in a desired pattern, as shown in FIG. 8. The film 41 may be a base film ordinarily used as a dry film type of hologram sensitive material. By way of example but not by way of limitation, use may be made of PET, TAC, Poly (vinyl chloride), polyethylene, PMMA. The hologram materials 42 and 43 sensitive to different wavelength regions, which may be used in the instant example, may be arbitrarily selected from sensitive materials so far known to be used in hologram application, for instance, dichromated gelatin, silver salt, and photopolymers. However, preference is given to photopolymer sensitive materials different from each other only in terms of the absorption wavelength of the dye added as a sensitizer. In FIG. 8, the hologram sensitive material 42 forms a zone sensitive to green light and the hologram sensitive material 43 forms a zone sensitive to red light.

Figure 8A:
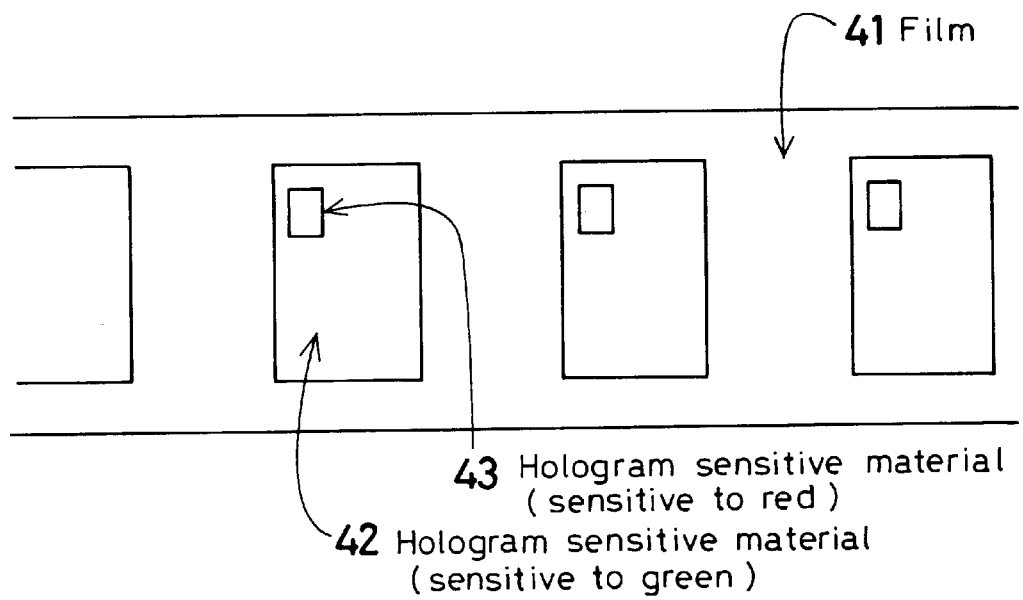
FIG. 8 is a schematic of a hologram recording sheet according to the invention.
Figure 8B:
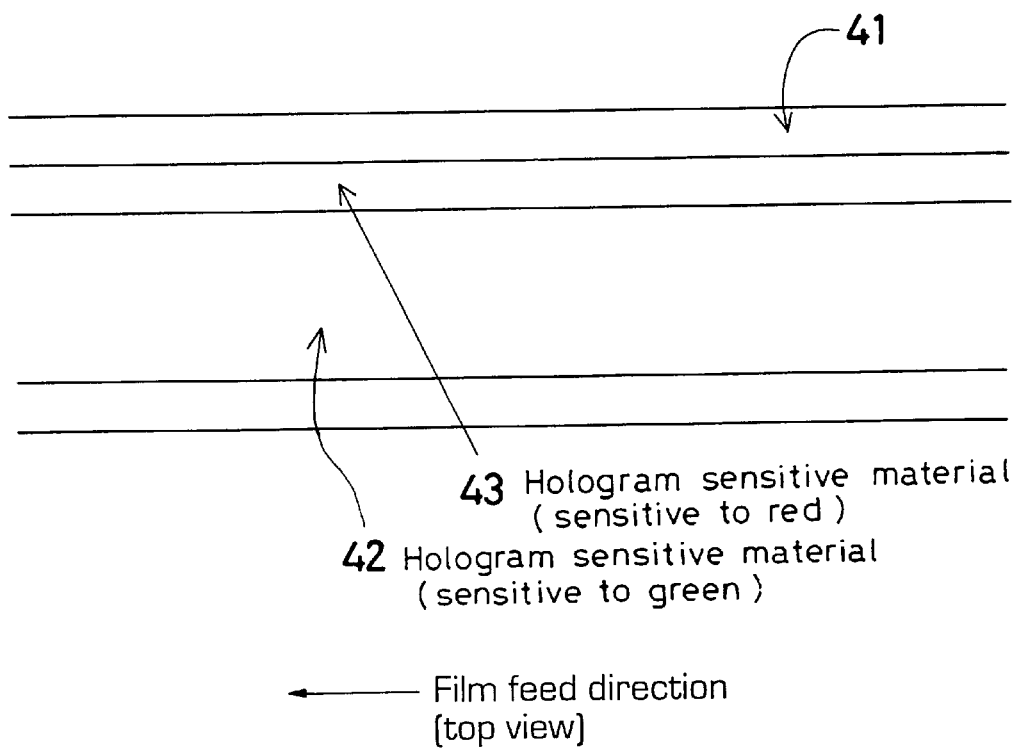
Figure 11:
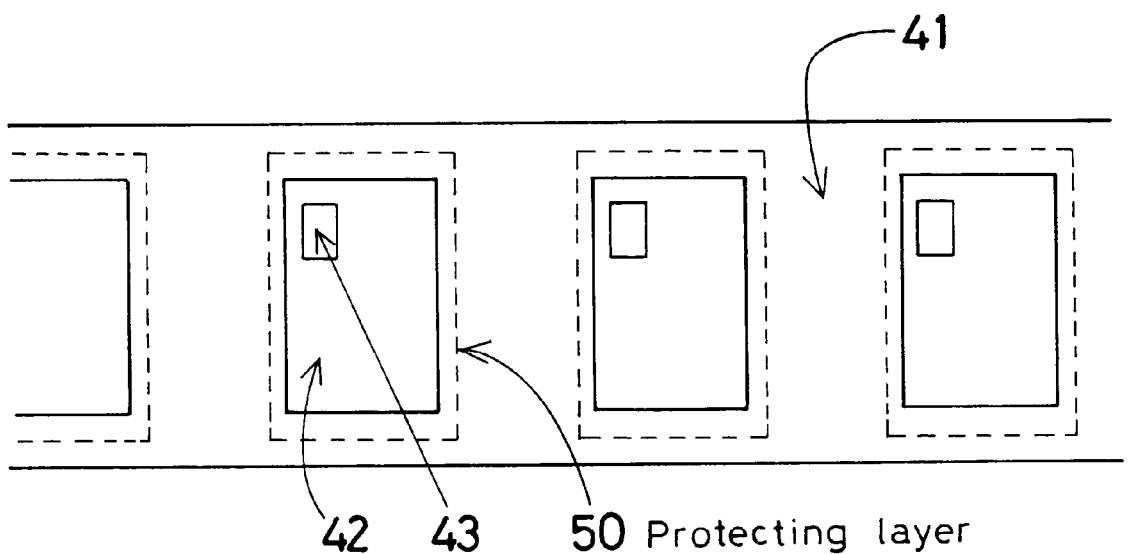
FIG. 11 is a schematic of a hologram recording sheet provided with a protecting layer.

The printing of the hologram sensitive materials 42 and 43 sensitive to different wavelength regions on the film 41 may be achieved in well-known manners, either by a continuous rolling-up procedure, e.g., gravure, roll, blade or die coating or by an intermittent rolling-up procedure, e.g., screen printing. In the case of such discontinuous patterns as shown in FIGS. 8(a) and 9(a), particular preference is given to screen printing that assures alignment accuracy and highly uniform film thickness. In the case of such striped patterns as shown in FIGS. 8(b) and 9(b), particular preference is given to relying on die coating printing due to its mass productivity.

By use of the thus obtained hologram recording sheet it is possible to selectively produce holograms at desired zones by desired laser light, because the sensitive materials sensitive to different wavelength regions are used. For the recording light sources used to this end, various well-known lasers may be used, inclusive of helium neon laser, argon laser, krypton laser, helium cadmium laser and ruby laser.

In the instant example, the interference fringes, for instance, the interference fringes 48 diffracting green light and the interference fringes 49 diffracting red light are produced independently in the thickness direction, as can be seen from FIG. 10.

If the protecting layer 50 is provided on each hologram sensitive material 42 (43), it can then be prevented from being injured or otherwise damaged. It is noted that the protecting layer 44 may be provided between each sensitive material and the film 41. In this case, if the hologram sensitive materials 42 and 43 are releasable from the film 41, the arrangement can then be used in the form of a transfer foil, etc.

EXAMPLE 1

For a solution sensitive to green light, 50 parts of polyvinylcarbazole, 40 parts of tribromophenoxyethyl methacrylate, 1 part of cyanine dye (NK-1420 made by Nippon Kanko Shikiso Co., Ltd.), 5 parts of 3,3',4,4'-tetra (t-butylperoxycarbonyl)benzophenone, and 5 parts of a non-ylphenyl alcohol/ethylene oxide adduct (Emulgen 903 made by Kao Soap Co., Ltd.) were dissolved in methyl ethyl ketone. For a solution sensitive to red light, 50 parts of polyvinylcarbazole, 40 parts of tribromophenoxyethyl methacrylate, 1 part of squarylium dye (NK-3024 made by Nippon Kanko Shikiso Co., Ltd.), 5 parts of 3,3',4,4'-tetra (t-butylperoxycarbonyl)benzophenone, and 5 parts of a non-ylphenyl alcohol/ethylene oxide adduct (Emulgen 903 made by Kao Soap Co., Ltd.) were similarly dissolved in methyl ethyl ketone. These solutions were printed on a 50 μm PET film (HP-7 made by Teijin Limited) by screen printing using a 150-mesh screen printing plate and then dried to form 10 cm·10 cm green-light sensitive zones and 2 cm·2 cm red-light sensitive zone, each having a thickness of 20 μm, according to the desired pattern shown in FIG. 8(*a*). The film was then fed 20 cm for similar printing. By repeating this, a hologram recording sheet was obtained, on which the green and red hologram sensitive material layers were arranged at an interval of 20 cm according to the desired pattern. This sheet was further laminated thereon with a PET film (Lumilar T60 made by Toray Industries, Inc.) and then rolled up.

Using 514 nm argon laser light and 647 nm krypton laser light as light sources, a head-up display combiner was produced on this hologram sensitive material. Consequently, a satisfactory speed-indicating projection chart was obtained, which included the speed indicator 46 projected in green color in the green-light diffracting zone 44 and the emergency warning light 47 projected in red color in the red-light diffracting zone 45, as shown in FIG. 9(*a*).

EXAMPLE 2

Methyl ethyl ketone solutions of the same photosensitive solutions as in Example 1 were printed on a 50 μm PET film (HP-7 made by Teijin Limited) by die coating using a slot orifice having different discharge ports of 25 cm and 5 cm, and then dried to form the green- and red-light sensitive materials, each having a thickness of 20 μm, according to the striped pattern shown in FIG. 8(*b*). This sheet was further laminated thereon with a PET film (Lumilar T60 made by Toray Industries, Inc.) and then rolled up.

Using 514 nm argon laser light and 647 nm krypton laser light as light sources, a head-up display combiner was produced on this hologram sensitive material by the sequential exposure technique . Consequently, a satisfactory speed-indicating projection chart was obtained, which included the speed indicator 46 projected in green color in the green-light diffracting zone 44 and the emergency warning light 47 projected in red color in the red-light diffracting zone 45, as shown in FIG. 9(*b*).

According to the instant examples mentioned above, since the hologram sensitive materials that enable the necessary diffracted light wavelengths to be recorded on the necessary zones are formed by pattern printing, a good-quality image can be obtained without producing any unnecessary interference fringes. At the same time, since most of hologram recording materials known so far in the art may be used as such, hologram recording is easily achievable at advantageous cost.

Another embodiment of the hologram recording sheet according to the invention will now be explained with reference to FIGS. 12 to 14, in which reference numeral 51 represents a film, 52 a hologram sensitive material (sensitive to green light), 53 a hologram sensitive material (sensitive to red light), 54 a spacer layer, 55 a protecting layer, 56 interference fringes that diffract green light, 57 interference fringes that diffract red light, 58 a display object (a speed indicator being shown as an example) that is projected in green color, and 59 a display object (an emergency warning light being shown as an example) that is projected in red color.

Figure 12:
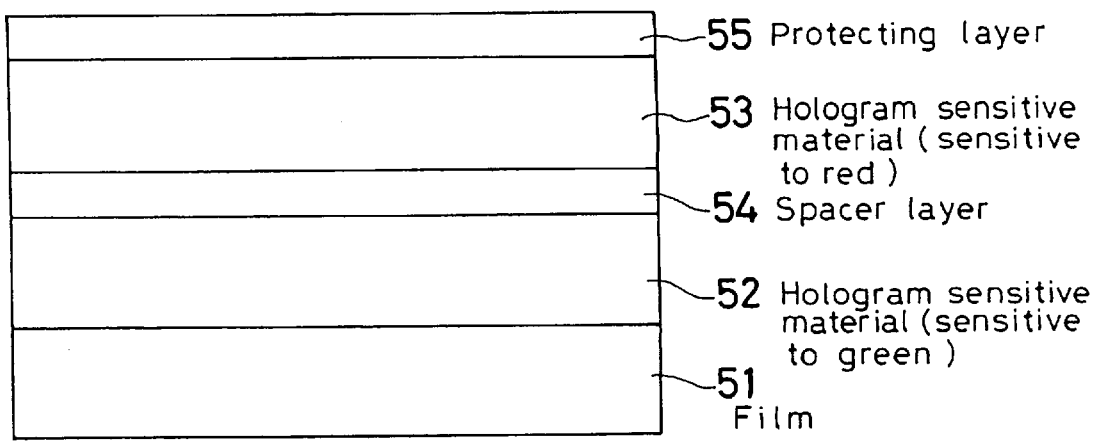
FIG. 12 is a schematic of another example of the hologram recording sheet according to the invention.
Figure 13:
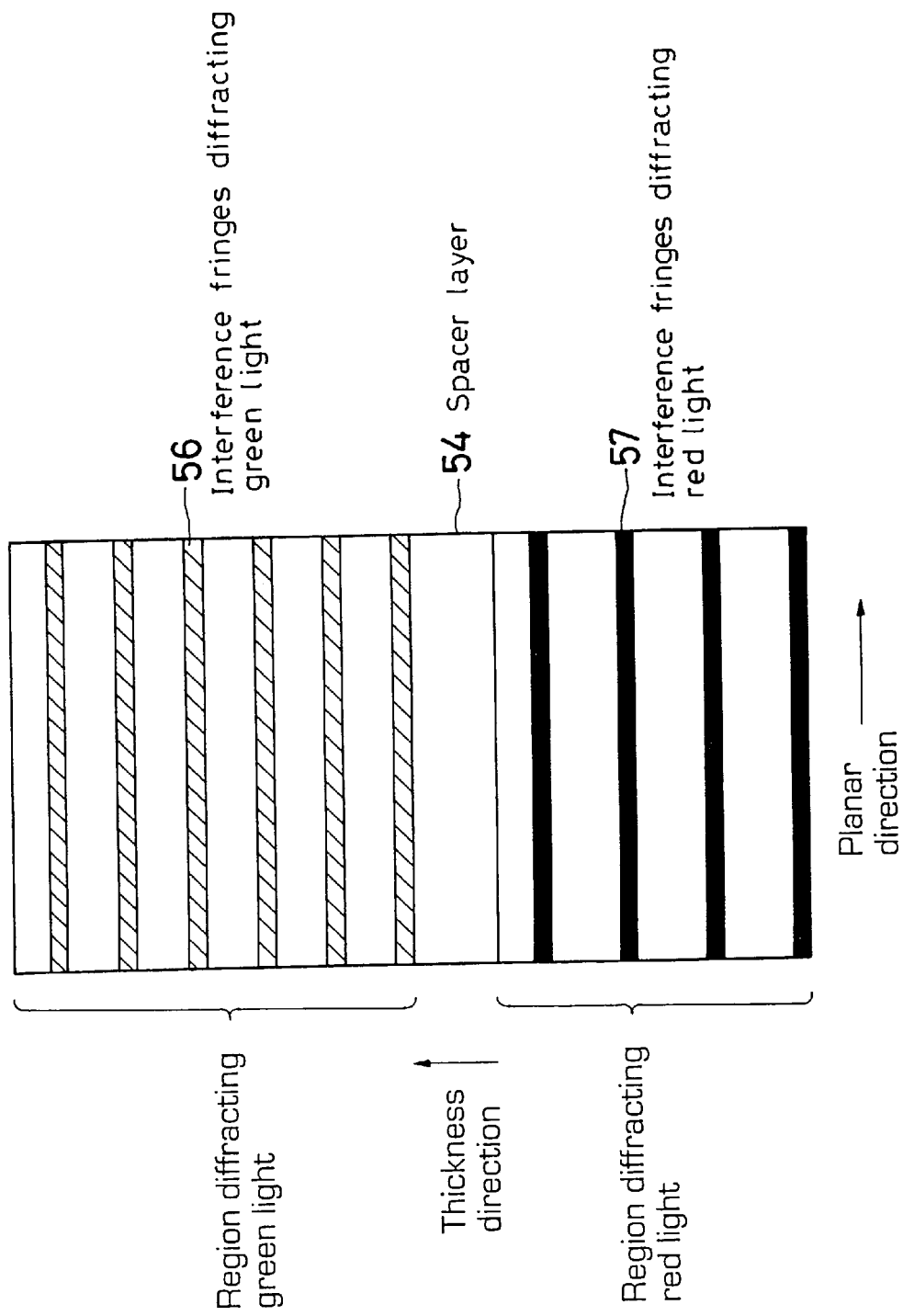
FIG. 13 is an imaginary schematic of interference fringes in a hologram recording sheet for multicolor recording purposes.

The hologram recording sheet according to the instant embodiment is made up of such layers as shown in FIG. 12. The film 51 and hologram sensitive materials 52 and 53 are the same as explained in connection with FIG. 8. For the spacer layer 54, a film made up of a material similar to that forming the base film, i.e., PET, TAC, Poly(vinyl chloride), polyethylene, PMMA or the like, may be used. Alternatively, the spacer layer may be formed by coating a solution of these resins in a suitable solvent, followed by drying.

To obtain such layer configuration as shown in FIG. 12, for instance, the hologram sensitive material 52 (sensitive to green light) is first printed and formed on the base film 51 by known coating techniques such as gravure coating, roll coating, blade coating or die coating. Then, the spacer layer 54 is laminated on the material 52. Finally, another hologram sensitive material 53 (sensitive to red light) is printed and formed on the spacer layer 54. In this case, the spacer layer 54 may also be formed by coating. In addition, techniques for preparing the above-mentioned layer configuration at once by multi-layer extrusion coating, multi-layer slide coating or the like may be applicable to the invention. If an additional protecting layer 55 is provided on the above-mentioned layer configuration, as shown in FIG. 12, it is then possible to prevent the hologram materials from being injured or otherwise damaged. It is noted that the protecting layer may be provided on the base film 51. In this case, if it is releasable from the base film 51, the layer configuration can then be used in the form of a transfer foil, for instance.

Then, a plurality of zones, in which the diffracted light differs in wavelength, are recorded on the hologram recording sheet of the above layer configuration in the form of two sets, independent as viewed in the thickness direction of the sensitive materials, of interference fringes. As shown, the interference fringes 56 that diffract green light and the interference fringes 57 that diffract red light are independently formed on both sides of the spacer layer 55. To produce such a hologram, each of the hologram sensitive materials of the hologram recording sheet is illuminated by laser light having a wavelength lying in the sensitive region peculiar to it.

Figure 14:
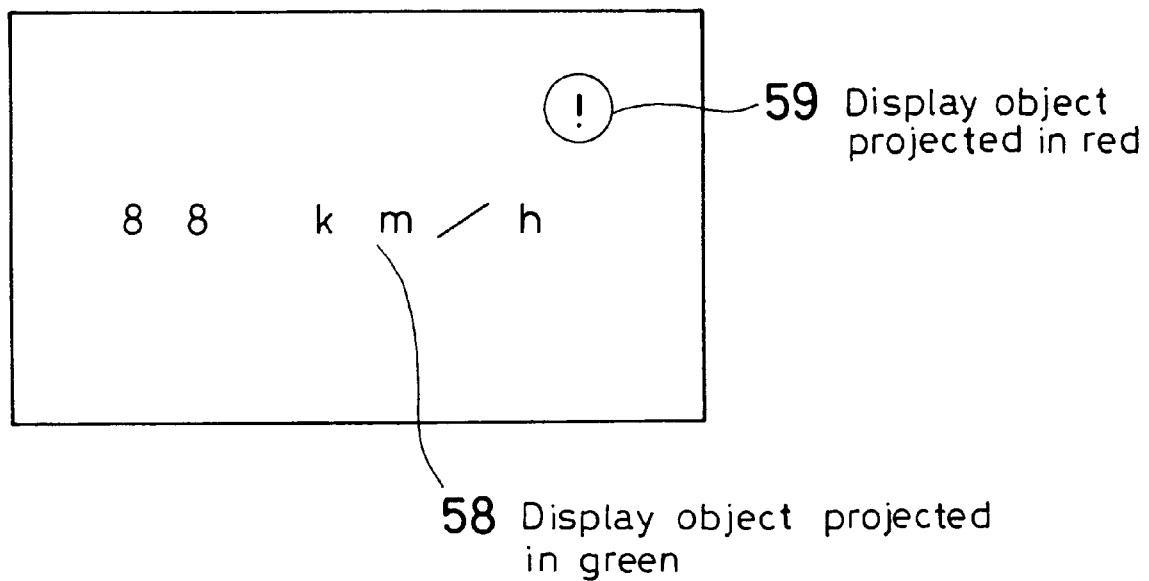
FIG. 14 is a projection schematic of a head-up display combiner produced with the hologram recording sheet shown in FIG. 12.

In the case of a head-up display combiner shown in FIG. 14, a satisfactory speed-indicating projection chart including the display object 58 that is projected in green color (a speed indicator being shown as an example) and the display object 59 that is projected in red color (an emergency warning light being shown as an example) is obtained on the above hologram sensitive materials, using 514 nm argon laser light and 647 nm krypton laser light.

According to the hologram recording sheet of the instant embodiment, the hologram sensitive materials sensitive to light of different wavelengths are laminated on each other with the spacer layer located between them. Hence, even when a dry type of hologram sensitive materials are used as the hologram sensitive materials, the migration of the monomer is limited to within each sensitive material layer, so that the pitch of the interference fringes can be established, as designed, irrespective of whether this is achieved by the simultaneous or sequential exposure technique.

EXAMPLE 3

The same green- and red-light sensitive solutions as in Example 1 were dissolved in methyl ethyl ketone at a solid content of 20 wt %. The resulting solution for green light was coated on a 50 μm PET film (HP-7 made by Teijin Limited) at a dry coverage of 25 μm by gravure coating using a gravure roll. Laminated on this layer was a 25 μm PET film (HP-7 made by Teijin Limited) treated on both it sides, on which the sensitive solution for red light was further coated at a dry coverage of 25 μm by gravure coating using a gravure roll. This sheet was laminated thereon with an additional PET film (Lumilar T60 made by Toray Industries, Inc.) and then rolled up.

Using 514 nm argon laser light and 647 nm krypton laser light as light sources, a head-up display combiner was produced on this hologram sensitive medium. Consequently, such a satisfactory speed-indicating projection chart as shown in FIG. 14 was obtained.

EXAMPLE 4

Methyl ethyl ketone solutions of the same photosensitive solutions as in Example 1 were provided. First, the solution for green light was coated on a 50 μm PET film (HP-7 made by Teijin Limited) by die coating and dried to a 25 μm green-light sensitive material layer. Laminated on this layer was then a 25 μm PET film (HP-7 made by Teijin) treated on both its sides, on which the solution for red light was printed by die coating and dried to obtain a 25 μm red-light sensitive material layer. This sheet was laminated thereon with an additional PET film (Lumilar T60 made by Toray Industries, Inc.) and then rolled up.

Using 514 nm argon laser light and 647 nm krypton laser light as light sources, a head-up display combiner was produced on this hologram sensitive medium. Consequently, such a satisfactory speed-indicating projection chart as shown in FIG. 14 was obtained.

According to these examples, since most of the hologram recording materials known so far in the art may be used, hologram recording is easily achievable at advantageous cost. In addition, since the hologram sensitive materials sensitive to light of different wavelengths are laminated on each other with the spacer layer located between them, plural sets of interference fringes with varying pitches can be independently produced, as designed, irrespective of whether this is achieved by either the simultaneous or sequential exposure techniques, so that a good-quality hologram can be recorded in multicolor.

A further embodiment of the hologram recording sheet according to the invention will now be explained with reference to FIGS. 15 and 16.

Figure 15A:
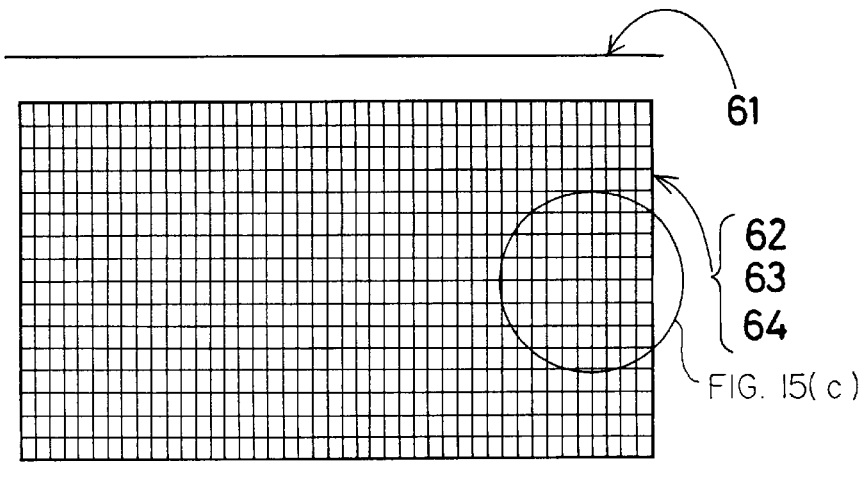
FIG. 15 is a schematic of a hologram recording sheet in which sensitive materials recording different wavelengths are formed in dotted configuration.
Figure 15B:
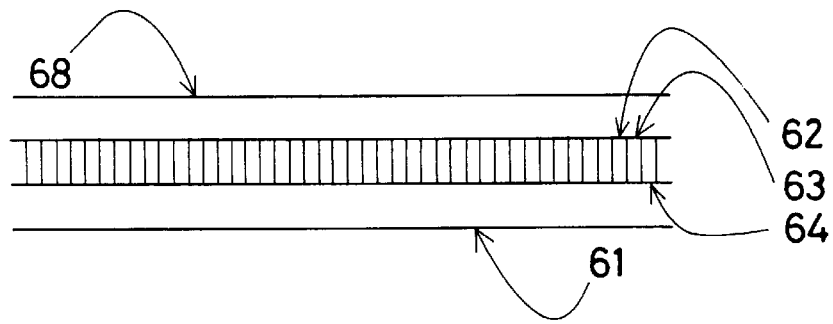
Figure 15C:
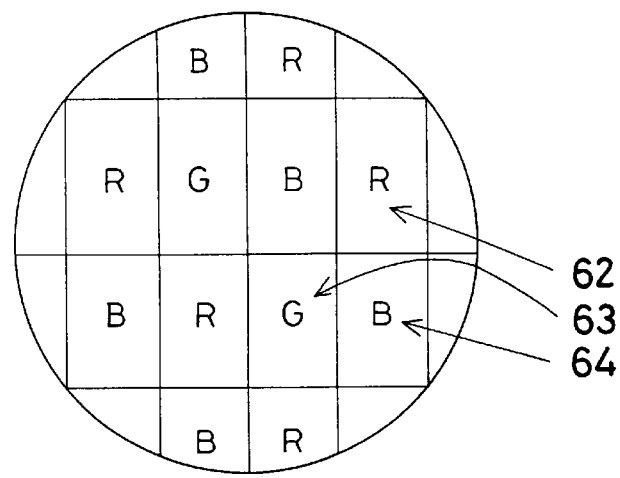
Figure 16A:
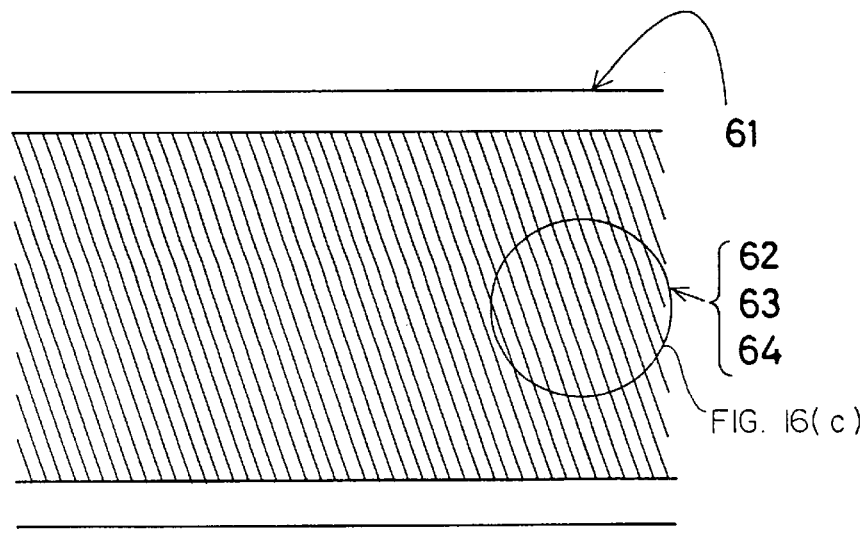
FIG. 16 is a schematic of a hologram recording sheet in which sensitive materials recording different wavelengths are formed in striped configuration.
Figure 16B:
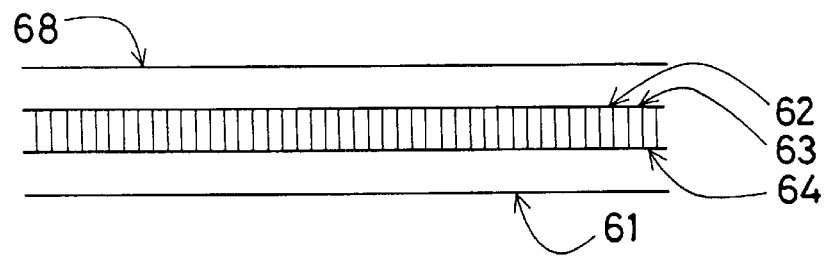
Figure 16C:
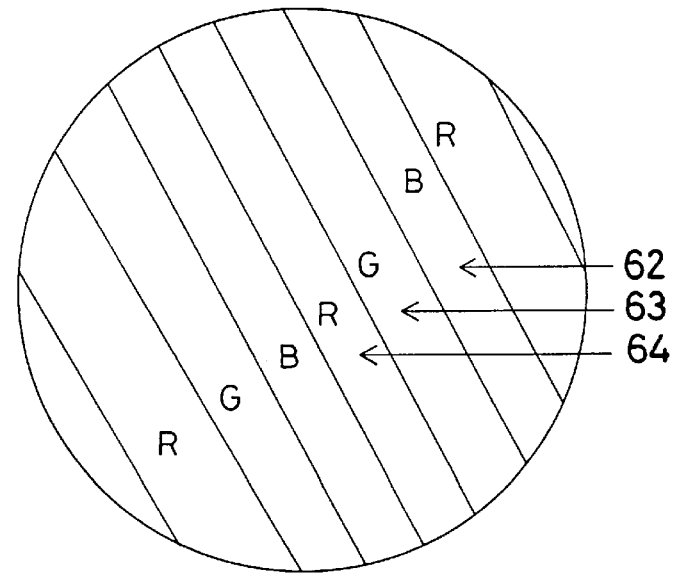

As shown in FIGS. 15 and 16, hologram-recording sensitive materials 62, 63 and 64 sensitive to blue, green and red light are formed on a film 61 in dotted or striped configuration. FIGS. 15(a) and 16(a) are top schematics, FIGS. 15(b) and 16(b) cross-sectional schematics, and FIGS. 15(c) and 16(c) partly enlarged schematics. The film 61 may be a base film ordinarily used for a dry film form of hologram sensitive material, and for this use may be made of PET, TAC, Poly(vinyl chloride), polyethylene, PMMA, etc. Also, the hologram-recording sensitive materials 62, 63 and 64 sensitive to different wavelengths, used in the invention, may be arbitrarily selected from sensitive materials heretofore known in the art to be used in hologram applications, for instance, bichromated gelatin, silver salt and photopolymers. Of these, preference is given to photopolymer sensitive materials differing from each other only in terms of the absorption wavelength of the dye added as a sensitizer.

Such hologram sensitive materials 62, 63 and 64 sensitive to different wavelengths may be printed and formed on the film 61 by gravure, screen or other known printing techniques.

Figure 18A:
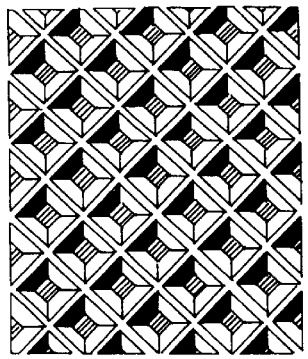
FIG. 18 is a schematic of a cell used for gravure printing.
Figure 18B:
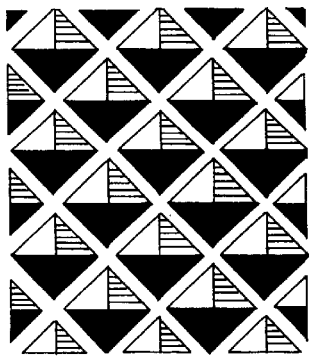

When these materials are formed in dotted configuration by gravure printing, as shown in FIG. 15, dot size and thickness may be arbitrarily determined depending on the cell geometry of the gravure. For instance, they may be printed in a given dotted pattern by using the gravure with a grating form of cells (FIG. 18(a)) or pyramidal cells (FIG. 18(b)). When reliance is on the screen printing technique, dot size and thickness may be determined by the count of the mesh and the configuration of the mask.

Figure 18C:
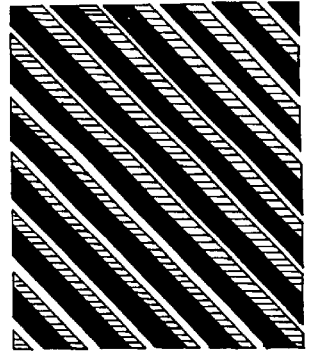

When these materials are formed in such striped configuration as shown in FIG. 16, hatched cells such as those shown in FIG. 18(c) are used, if reliance is on the gravure printing technique. When reliance is on the screen printing technique, what types of stripes are used may be determined by the count of the mesh and the configuration of the mask.

It is understood that, as shown in FIGS. 15 and 16, if protecting films 68 are provided on the hologram sensitive materials 62, 63 and 64, it is then possible to prevent them from being injured or otherwise damaged. In this case, the protecting films may be provided on the film 61. If the hologram sensitive materials 62, 63 and 64 are releasable from the film 61, the layer configuration may then be used in the form of transfer foils, for instance.

Various approaches are thought of for achieving the alignment of varying hologram sensitive materials. However, the simplest approach is to make use of a marker separately provided on the film, as usually done for ordinary printing. The key point is to reduce the leveling for transferring the pattern neatly, but this may be achievable by taking care of viscosity, solvent and cell geometry. Pattern width may be arbitrarily determined depending on the space between the cells or the number of the cells (the number of the cells per inch), while sensitive material thickness may be arbitrarily determined depending on cell depth. The larger the space between the dots or stripes, the easier the processing is. At a space exceeding 200 μm, however, they can be visible to the naked eye in mosaic configuration. In other words, the resulting multicolor display becomes impractical. Hence, the space must preferably be as small as possible in view of image quality.

Figure 19:
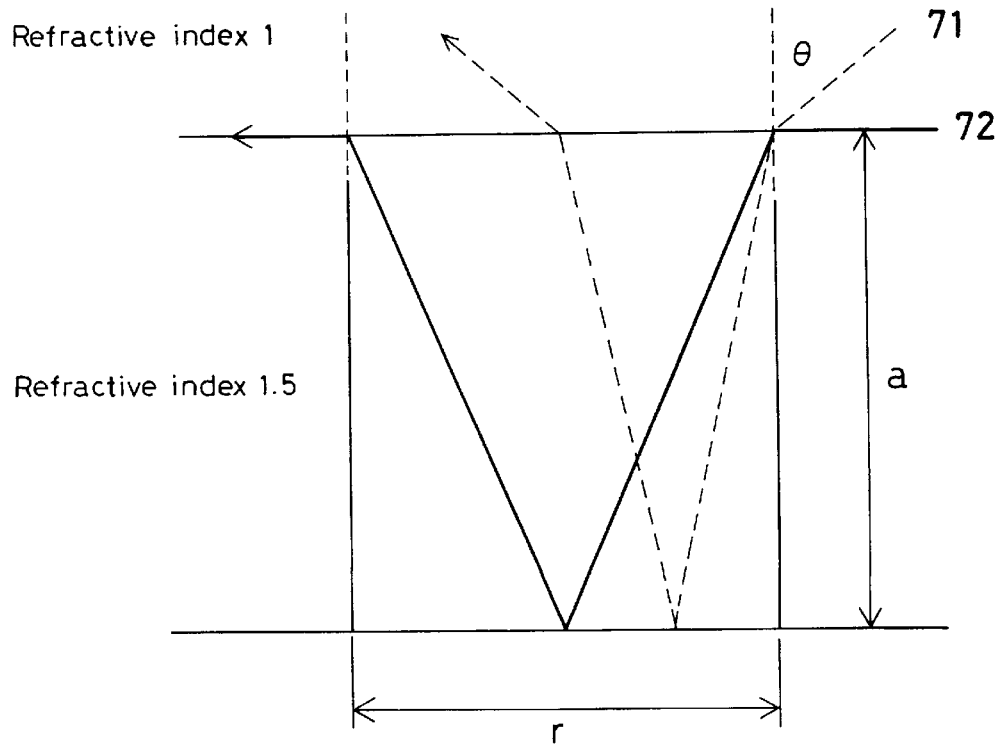
FIG. 19 represents an optical path passing through a hologram.

In the case of a Lippmann or reflection hologram, that separation must be of some magnitude in view of hologram performance. Since a general photosensitive material has a refractive index of nearly 1.5 and air has a refractive index of 1, optical paths taken by the incident light through the photosensitive material are shown at 71 and 72 in FIG. 19.

Now consider the optical path 72 taken by light that falls on the photosensitive material at a position at an angle of nearly 90° with respect to the normal line. The angle of incidence of light in the photosensitive material is found by the diffraction equation to be:

$$\theta = \sin^{-1}(1/1.5) = 41.8°$$

so that, to reflect light within the size r in μm of the photosensitive material, $$r = a \cdot 2 \cdot \tan(41.8)$$
$$= 1.79 \cdot a$$

where a is the film thickness in μm. To diffract light effectively, therefore, it is clear that the size of the photosensitive material must be at least nearly twice as large as the thickness of the film. In the case of an optical path, like the optical path 71, taken by light that is incident at an angle smaller than that incident on the optical path 72 in FIG. 19, the light is allowed to exit at a shorter radius.

Figure 17A:
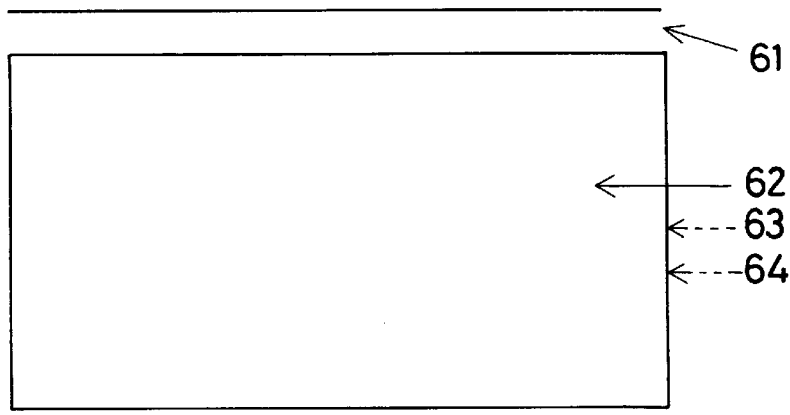
FIG. 17 is a schematic of a hologram recording sheet in which sensitive materials recording different wavelengths are formed independently in the thickness direction.
Figure 17B:
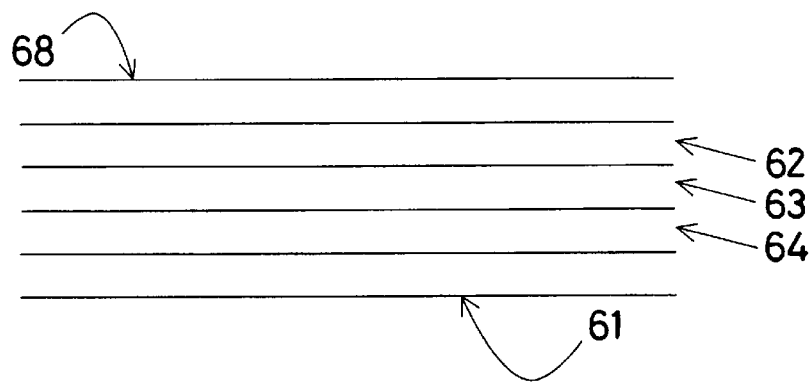

Alternatively, a hologram recording film 61 on which layers sensitive to varying wavelengths are coated in multilayer configuration may be used, as shown in FIG. 17. It is here understood that FIGS. 17(a) and 17(b) are top and cross-sectional views, respectively. As shown, a protecting layer 68 is formed on the uppermost layer. In this case, such problems as explained with reference to FIG. 19 do not arise, because the layer configuration is flat in the areal direction.

With the hologram recording sheet produced by the above method in which the respective layers are different from each other in terms of sensitivity to wavelength, it is possible to produce a hologram on a desired region by the selective illumination of laser light. Here, various lasers known so far in the art, for instance, helium laser, argon laser, krypton laser, helium cadmium laser and ruby laser may be used as recording light sources. It is understood that a relief hologram may be produced by CGH (computer generated hologram).

A hologram combiner or display hologram, for which the hologram recording sheet according to the instant embodiment is used, will now be explained.

The hologram combiner or display hologram according to the invention is made up of sets of interference fringes that are independently formed in dotted configuration (see FIG. 20(a)) or striped configuration (see FIG. 20(b)), or sets of interference fringes superposed in the thickness direction, as shown in FIG. 20(c). To produce the interference fringes in dotted or striped configuration, as shown in FIGS. 20(a) and 20(b), there is one possible method in which hologram recording is made using a hologram recording film 61 on which materials 62, 63 and 64 sensitive to blue, green and red light are printed in a mosaic pattern. Alternatively, the hologram recording film may be exposed to blue, green and red light during hologram recording, while it is masked.

To produce sets of interference fringes independently in the thickness direction, as shown in FIG. 20(c), the hologram recording film 61 on which hologram sensitive materials sensitive to different wavelengths are coated in multilayer configuration, as shown in FIG. 17, is subjected to simultaneous or sequential exposure for hologram recording. Alternatively, these materials may be laminated together after recording the holograms thereon.

Figure 21:
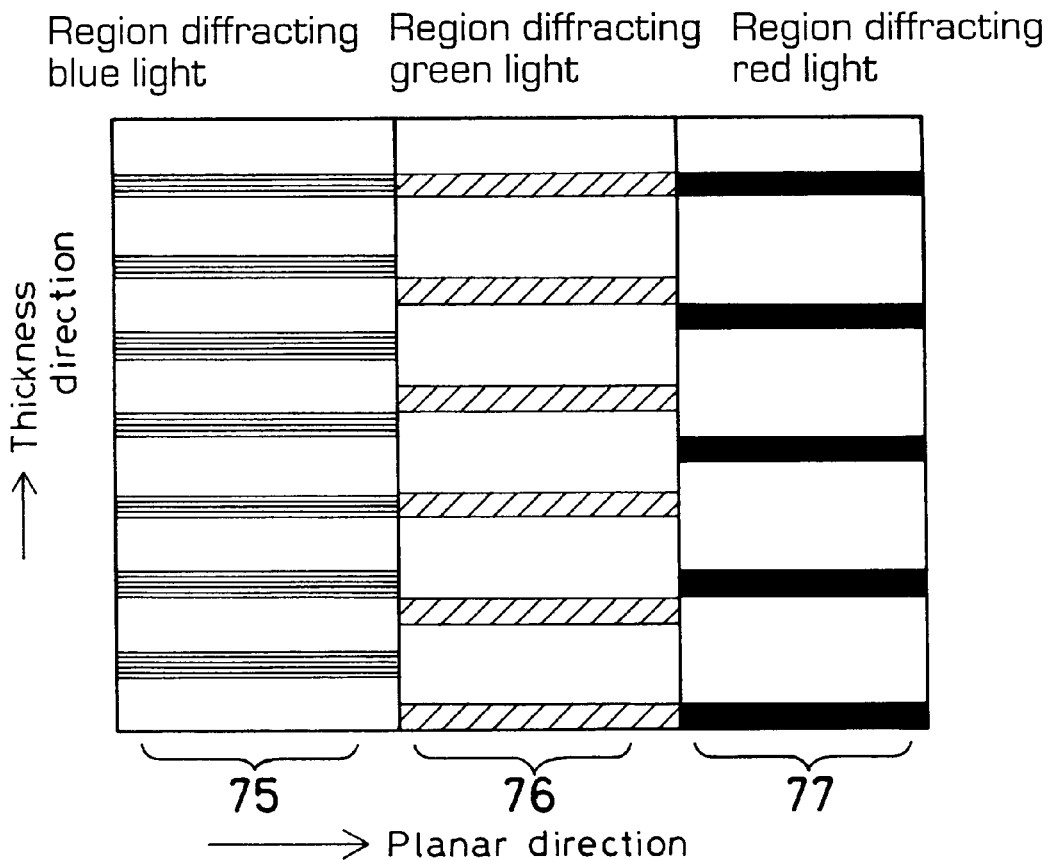
FIG. 21 is a schematic of Lippmann hologram's interference fringes produced independently in the planar direction.
Figure 22:
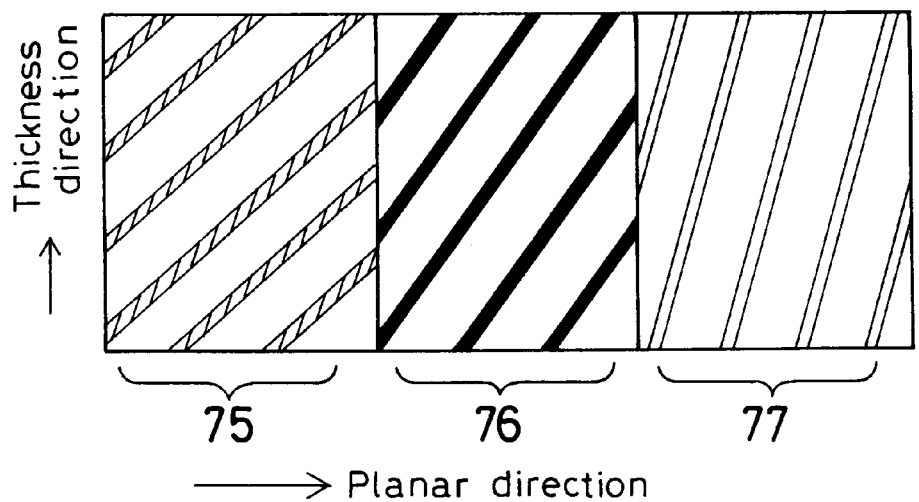
FIG. 22 is a schematic of laser light-reconstructing or rainbow hologram's interference fringes produced independently in the planar direction.

When a Lippmann hologram is used, regions 75, 76 and 77 for diffracting blue, green and red light, respectively, are formed independently in the planar direction, as shown in FIG. 21. In the case of a transmission hologram, too, a region for diffracting each of blue, green and red light is formed independently in the planar direction, as shown in FIG. 22.

Figure 23:
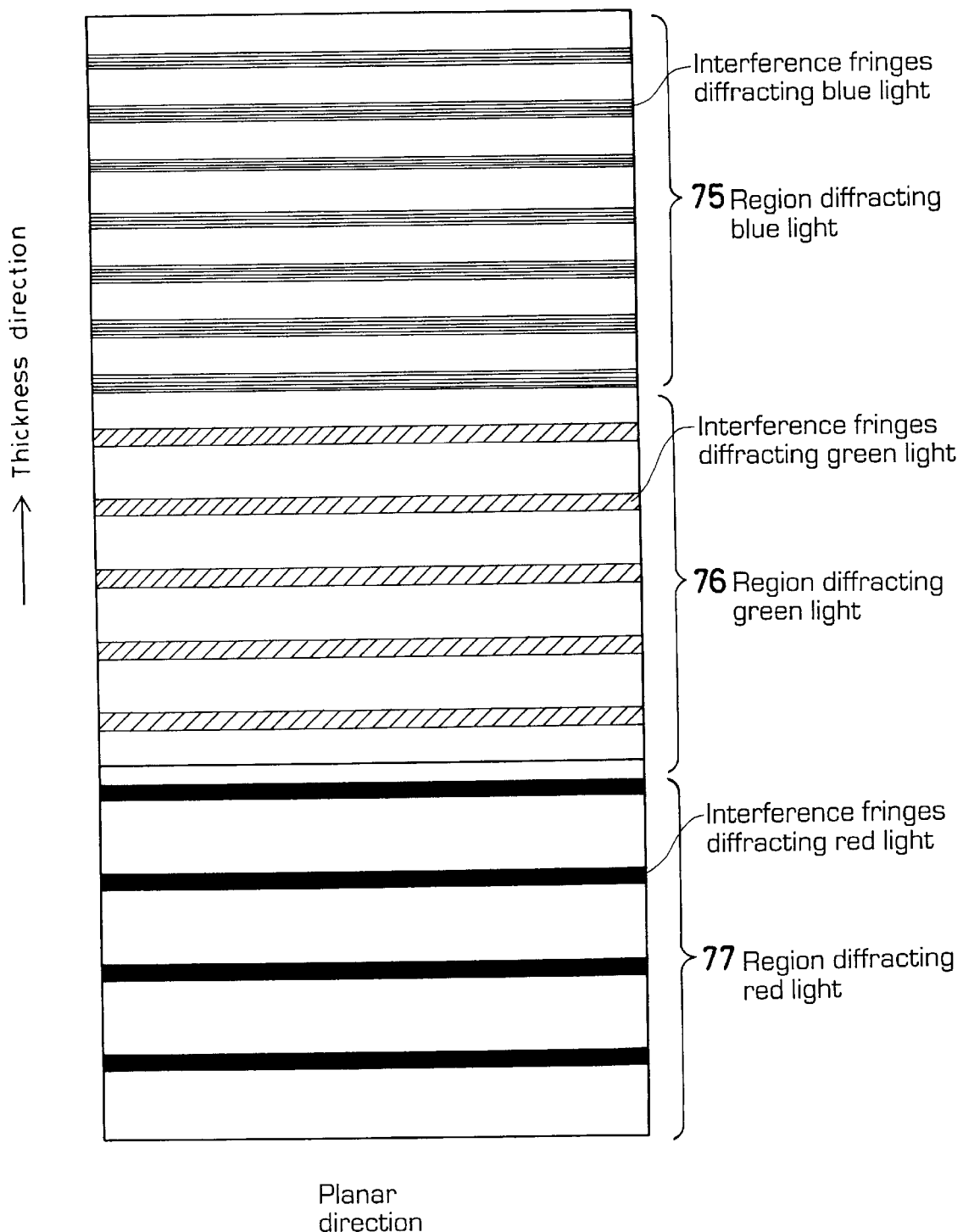
FIG. 23 is a schematic of Lippmann hologram's interference fringes superposed independently in the thickness direction.
Figure 24:
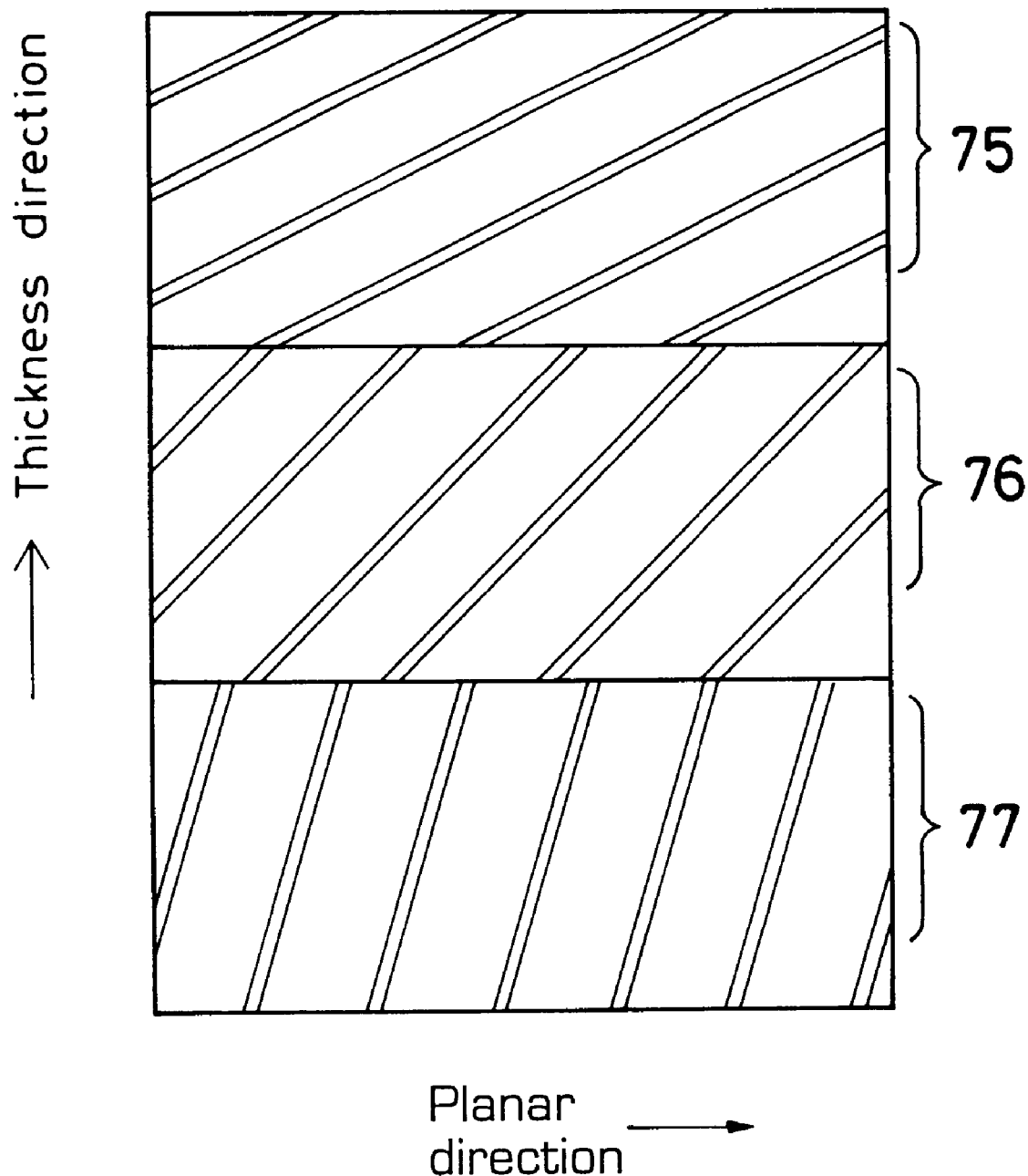
FIG. 24 is a schematic of laser light-reconstructing hologram's interference fringes produced independently in the thickness direction.

These diffracting regions may be formed independently in the thickness direction. In the case of a Lippmann hologram, regions 75, 76 and 77 for diffracting blue, green and red light, respectively, are formed, as illustrated in FIG. 23. In the case of a transmission hologram, too, these diffracting regions are formed independently in the thickness direction, as shown in FIG. 24.

Figure 25A:
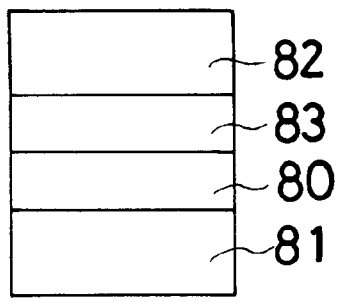
FIG. 25 is a schematic of an automotive head-up display.
Figure 25B:
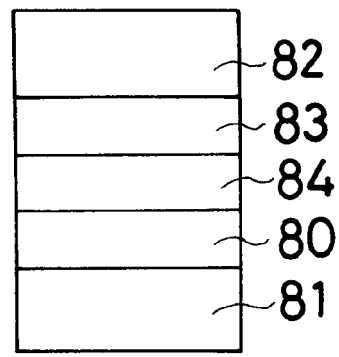
Figure 25C:
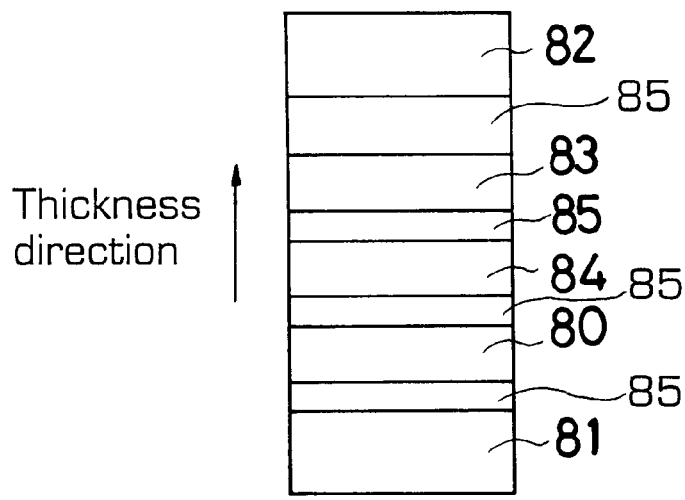

It is understood that when the hologram recording sheet is used as an automotive head-up display combiner, it is necessary that glasses 81 and 82 be laminated together with a hologram combiner 80 sealed between them, as shown in FIG. 25. In general, the hologram combiner is sealed together with a polyvinyl butyral resin 83, as shown in FIG. 25(a). In some cases, the hologram combiner may come into close contact with the polyvinyl butyral resin, resulting in some degradation of image quality. To avoid this, a barrier film 84 may be provided between the glasses, as shown in FIG. 25(b). To achieve an improvement in impact resistance, an adhesive layer 85 may be provided on each interface, as shown in FIG. 25(c).

EXAMPLE 5

The same solutions sensitive to green and red light as in Example 1 were provided. Additionally, there was provided a solution sensitive to blue light consisting of 50 parts by polyvinylcarbazole, 40 parts of tribromophenoxyethyl methacrylate, 1 part of cyanine dye (NK-723 made by Nippon Kanko Shikiso Co., Ltd.), 5 parts of 3,3',4,4'-tetra (t-butylperoxycarbonyl)benzophenone, and 5 parts of a non-ylphenyl alcohol/ethylene oxide adduct (Emulgen 903 made by Kao Soap Co., Ltd.) were dissolved in methyl ethyl ketone. These solutions, dissolved in methyl ethyl ketone at a solid content of 30%, were sequentially coated on a 50 $\mu$m PET film (HP-7 made by Teijin Limited) by the gravure printing technique using gravure printing plates with various cell geometries, thereby producing the desired patterns shown in FIGS. 15 and 16. Each hologram recording sheet was laminated thereon with a PET film (Lumilar T60 made by Toray Industries, Inc.) and then rolled up. Set out in Table 1 are the pattern configurations, etc., of the obtained films.

TABLE 1

| Configurations of Gravure Printing Plates | | | |
|---|---|---|---|
| No. | Cell Geometry | Depth, $\mu$m | Number of Lines per inch |
| 1 | Grating | 250 | 60 |
| 2 | Grating | 250 | 175 |
| 3 | Grating | 250 | 250 |
| 4 | Grating | 250 | 400 |
| 5 | Pyramid | 200 | 60 |
| 6 | Pyramid | 200 | 175 |
| 7 | Hatched | 150 | 60 |
| 8 | Hatched | 150 | 175 |
| 9 | Hatched | 150 | 150 |

| Configurations of Sensitive Materials | | | |
|---|---|---|---|
| No. | Geometry | Film Thickness, $\mu$m | Size, $\mu$m |
| 1 | Dotted | 20 | 250–400 |
| 2 | Dotted | 20 | 80–150 |
| 3 | Dotted | 20 | 60–100 |
| 4 | Dotted | 20 | 30–60 |
| 5 | Dotted | 15 | 200–300 |
| 6 | Dotted | 15 | 60–120 |
| 7 | Striped | 20 | 300–450 |
| 8 | Striped | 20 | 100–200 |
| 9 | Striped | 20 | 80–120 |

EXAMPLE 6

The same photosensitive solutions as in Example 5, dissolved in methyl ethyl ketone, were screen-printed on a 50 $\mu$m (HP-7 made by Teijin Limited) in the striped pattern shown in FIG. 16. This sheet was laminated thereon with an additional PET film (Lumilar T60 made by Toray Industries, Inc.) and then rolled up. Set out in Table 2 are the pattern configurations, etc. of the thus obtained films.

TABLE 2

| Configurations of Screen Plates | | | |
|---|---|---|---|
| No. | Mask Geometry | Line Width lines/inch | Number of Lines lines/inch |
| 10 | Hatched | 60 | 150 |
| 11 | Hatched | 250 | 300 |
| 12 | Hatched | 400 | 400 |
| 13 | Hatched | 600 | 400 |

| Configurations of Sensitive Media | | | |
|---|---|---|---|
| No. | Geometry | Film Thickness, $\mu$m | Size, $\mu$m |
| 10 | Striped | 40 | 350–400 |
| 11 | Striped | 40 | 80–120 |

TABLE 2-continued

| 12 | Striped | 40 | 50–70 |
| 13 | Striped | 40 | 5–20 |

Figure 6A:
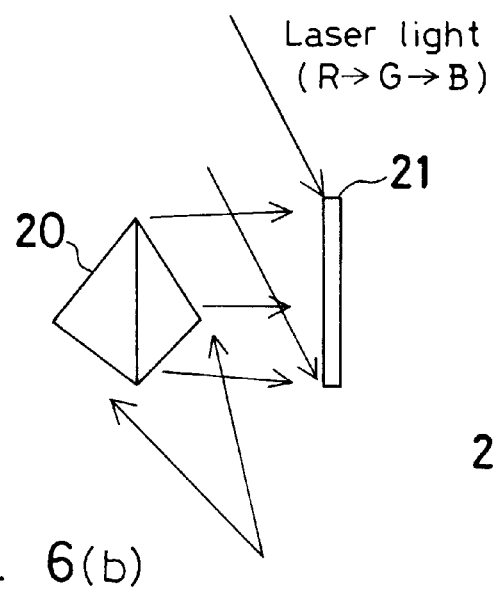
FIG. 6 is a schematic of an optical system for recording and reconstructing a Lippmann hologram.
Figure 6C:
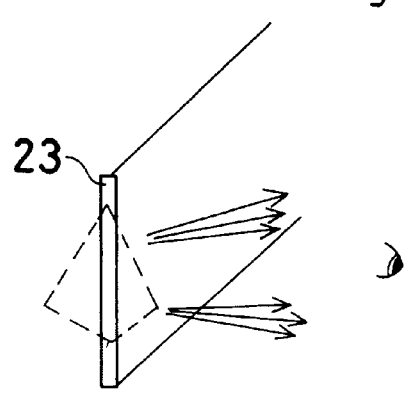
Figure 6B:
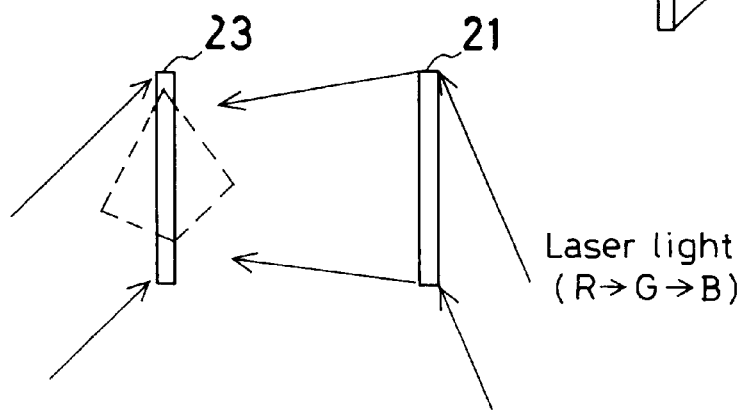
Figure 7A:
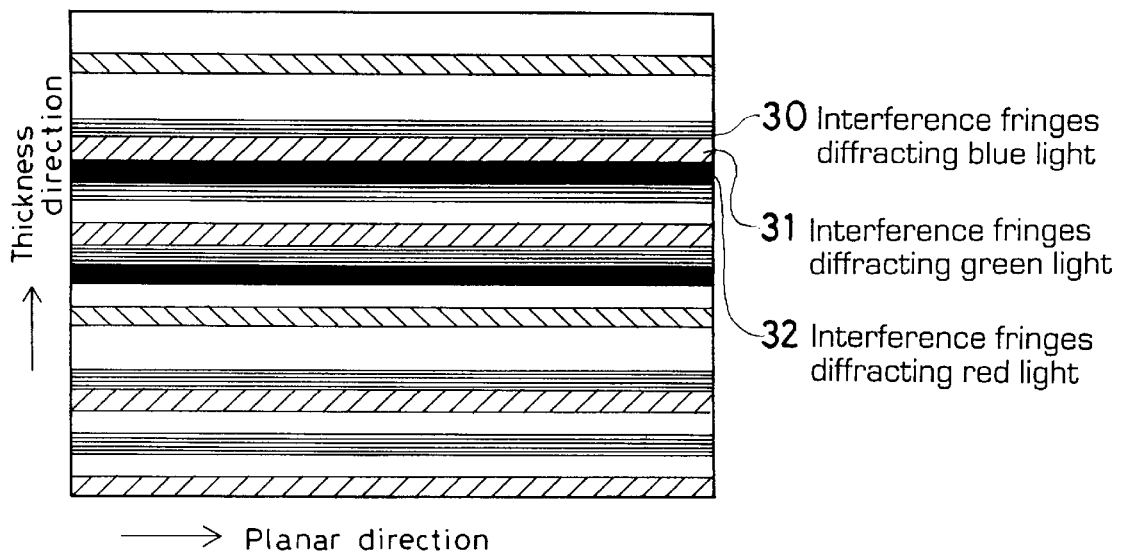
FIG. 7 is an imaginary schematic of interference fringes in a conventional hologram recording sheet for multicolor recording purposes.
Figure 7B:
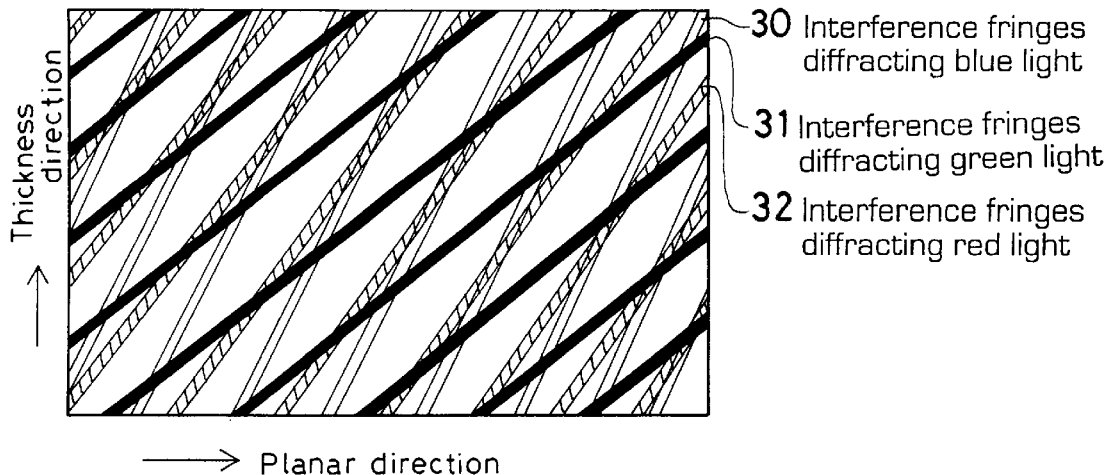

Hologram sensitive materials 1 to 13 were sequentially exposed to 458 nm argon laser light, 578 nm dye laser light and 647 nm krypton laser light, thereby making head-up multicolor display combiners with the characteristics set out in Table 3. Through the optical system shown in FIG. 6 using blue (488 nm), green (578 nm) and red (647 nm) laser light, hologram recording was made with the hologram recording sheets on which the hologram materials sensitive to blue, green and red light were formed with the configuration, film thickness and size shown in Table 1, thereby producing display holograms capable of diffracting 460 nm blue light, 545 nm green light and 610 nm red light. These holograms are found to have similar characteristics (see Table 3).

TABLE 3

Hologram Recording Sheets (Hologram Combiners)

| No. | Configurations | Film Thickness, μm | Size, μm |
| --- | --- | --- | --- |
| 14 | Dotted | 20 | 250–400 |
| 15 | Dotted | 20 | 80–150 |
| 16 | Dotted | 20 | 60–100 |
| 17 | Dotted | 20 | 30–60 |
| 18 | Dotted | 15 | 200–300 |
| 19 | Dotted | 15 | 60–120 |
| 20 | Striped | 20 | 300–450 |
| 21 | Striped | 20 | 100–200 |
| 22 | Striped | 20 | 80–120 |
| 23 | Striped | 40 | 350–400 |
| 24 | Striped | 40 | 80–120 |
| 25 | Striped | 40 | 50–70 |
| 26 | Striped | 40 | 5–20 |

Hologram Combiners (Image Quality of Display Holograms)

| No. | Image Appearance | Image Brightness |
| --- | --- | --- |
| 14 | R, G and B separated | Bright |
| 15 | Good | Bright |
| 16 | Good | Bright |
| 17 | Good | Bright |
| 18 | Good | Bright |
| 19 | Good | Bright |
| 20 | R, G and B separated | Bright |
| 21 | Good | Bright |
| 22 | Good | Bright |
| 23 | R, G and B separated | Bright |
| 24 | Good | Bright |
| 25 | — | Dark |
| 26 | — | Dark |

EXAMPLE 7

Figure 5A:
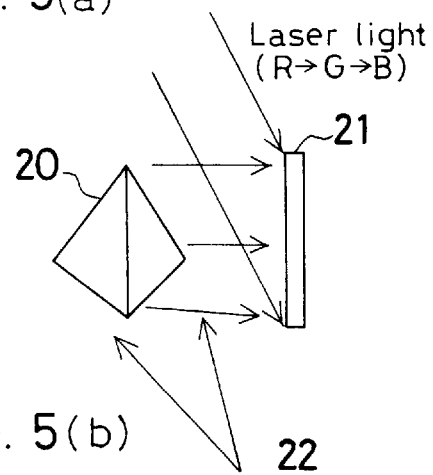
FIG. 5 is a schematic of an optical system for recording and reconstructing a rainbow hologram.
Figure 5C:
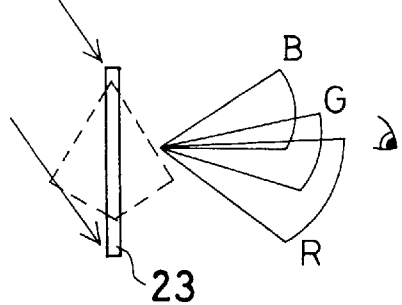
Figure 5B:
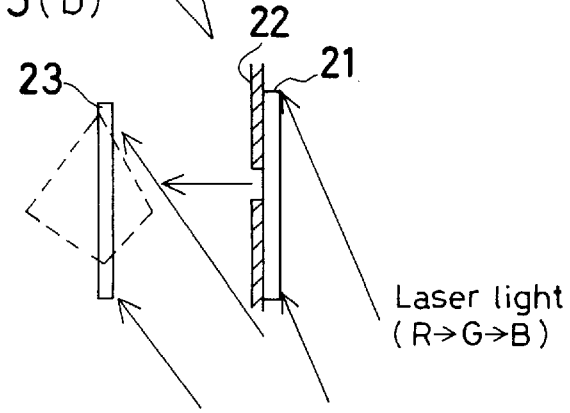

Through the optical system shown in FIG. 5 using blue (488 nm), green (578 nm) and red (647 nm) laser light, holograms were recorded on hologram recording sheets on which the hologram recording materials sensitive to blue, green and red light were superposed with the film thickness set out in Table 2, producing display holograms and hologram combiners capable of diffracting 460 nm blue light, 545 nm green light and 610 nm red light. Then, white light and CRT images were respectively projected on these display holograms and hologram combiners. The image quality obtained is set out in Table 4.

TABLE 4

Hologram Recording Sheets (Hologram Combiners)

| No. | Blue (μm) | Green (μm) | Red (μm) |
| --- | --- | --- | --- |
| 27 | 10 | 10 | 10 |
| 28 | 20 | 20 | 20 |

Image Quality of Display Holograms (Hologram Combiners)

| No. | Image Appearance | Image Brightness |
| --- | --- | --- |
| 27 | Good | Bright |
| 28 | Good | Bright |

According to these examples, since the hologram sensitive materials that enable the necessary diffraction wavelengths to be recorded on the necessary regions are formed as by pattern printing in a dotted or striped pattern with the size at least twice as large as the film thickness of the sensitive materials or of up to 200 μm, good image quality can be displayed in multicolor without producing unnecessary interference fringes. At the same time, most of hologram recording sensitive materials known so far in the art may be used as such. In addition, hologram recording is easily achieved at advantageous cost.

It is noted that the hologram recording sheets according to the instant examples can be used not only for multicolor head-up display combiners but for ornamental and forgery-preventing purposes as well.

It is also noted that, by use of the sheet according to the instant examples is it possible to produce a display hologram capable of diffracting at least two types of light, which achieves a good display of sufficient brightness in multicolor without producing unnecessary interference fringes.

The heat-wave reflecting film according to the invention will now be explained.

For the photosensitive layer used as the heat-wave reflecting film according to the invention, ordinary photosensitive materials for holograms may be used. For instance, use may be made of a wet type material which is developed using polyvinyl carbazole as a binder polymer to dissolve an unexposed region or a dry type material which makes use of the diffusion, etc., of a monomer during exposure, thus dispensing with any development step.

Figure 26:
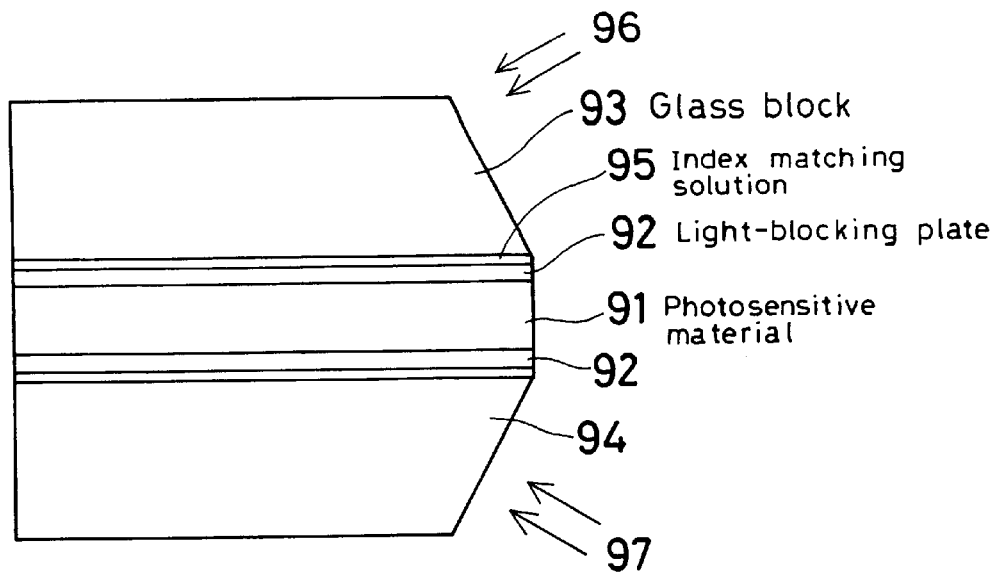
FIG. 26 is a schematic of how to produce a heat-wave reflecting film according to the invention.
Figure 27:
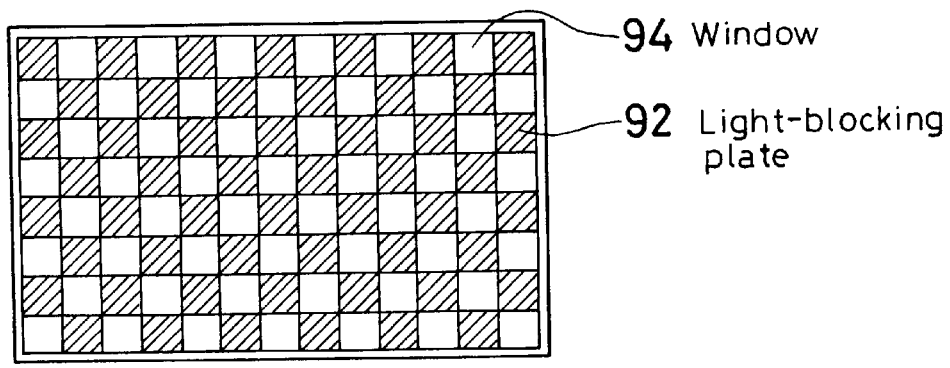
FIG. 27 is a schematic of a light-blocking plate.
Figure 28:
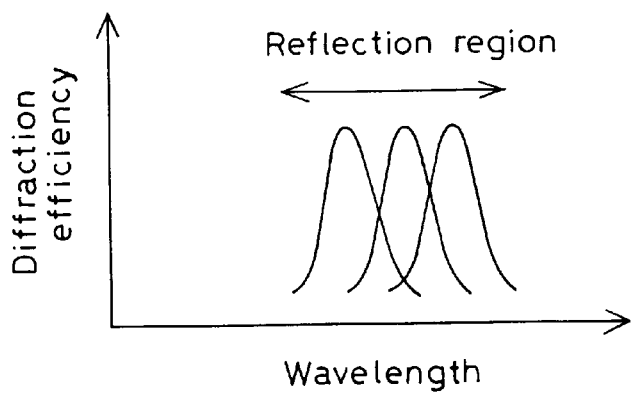
FIG. 28 is a schematic of a reflection wavelength region.

As shown in FIG. 26, light-blocking plates 92 are put on both sides of a photosensitive material 91. As shown in FIG. 27, each light-blocking plate 92 is provided with a mosaic array of windows, each with one side of a few cm$^2$. A glass block 93 or 94 having an end face at a desired angle is put on the light-blocking plate 92 through an index matching solution 95. The index matching solution 95 used has an index of refraction close to that of the photosensitive material 91. The angle θ of the end face of the glass block 93 or 94 is given by Eq. (1):

$$\sin \theta_1 = \lambda_1 / 2dn_0 \quad (1)$$

where $\lambda_1$ is the exposure wavelength, $n_0$ is the index of refraction of the photosensitive material and d is the spacing of the diffraction grating to be recorded. This diffraction grating spacing d is then given by $$d = \lambda_2 / 2n_0 \quad (2)$$

where $\lambda_2$ is the wavelength to be diffracted and $n_0$ is the index of refraction of the photosensitive material. Then, parallel laser light beams 96 and 97 are allowed to pass from the end faces of the glass blocks 93 and 94 through the photosensitive material 91 for interference, followed by removal of the glass blocks and index matching solution (notice that this holds for the dry type). After this, a substance having swelling action is injected under the windows in the light-blocking plates 92. For this injection osmotic pressure may be used, and for the substance having swelling action a monomer with a small structure or the like may be used.

After the interference fringes have been produced in this way, light-blocking plates with the positions of windows opposite to those shown in FIG. 27 are put on for similar treatments. In this case, however, the angles θ of the glass blocks are so varied that laser light is allowed to be incident vertically on the end faces to produce interference fringes with a different grating spacing. In the case of the wet type, solvent development may be done at the above step after exposure. What type of developer is used may be determined depending on the binder polymer used. For instance, if it is polyvinyl carbazole, acetone, methyl ethyl ketone, etc. can then be used, and if it is PMMA or its copolymer with styrene or the like, alcohol, ethylene glycol monoethyl ether, etc., can then be used.

When 488 nm argon laser light is used in this manner, a heat wave near 1,000 nm can be diffracted at a glass block angle θ of 61° and a heat wave near 1,400 nm at a glass block angle θ of 70°. It is here noted that this is also achievable without recourse to the light-blocking plates. For instance, two types of interference fringes with a uniform grating spacing may be used, if they are rearranged in a mosaic array, although the overall diffraction efficiency will drop. Alternatively, the area ratio may be changed depending on an energy reduction in the longer wavelength side of the sunlight.

In this way, it is possible to produce a region which enables the diffraction efficiency to show a peak with respect to a plurality of wavelength regions; in other words, it is possible to obtain a heat-wave reflecting film that can reflect heat waves in a wide wavelength range.

EXAMPLE 8

Light-blocking plates, index matching solutions and glass blocks (θ=60°) were laminated on both sides of a 20-μm thick film of Omnidex 352 (Du Pont) in this order. Then, 488 nm argon laser light was split into two parallel beams, which were then allowed to be incident vertically on both the glass blocks for interference in the film. Interference fringes could be produced by exposure at 20 mJ/cm². The same procedure was repeated using light-blocking plates with the positions of the openings opposite to those mentioned above and glass blocks (θ=70°). Further, the glass blocks, index matching solutions and light-blocking plates were removed, followed by the lamination of a color tuning film at 100° C. After this, the film sheet was post-baked at 130° C. for 1 hour. The resulting film sheet was found to show diffraction peaks at around 1,000 nm and 1,400 nm with a diffraction efficiency of 95%. The film sheet was then put on all the window glasses of a car and allowed to stand alone. As a result, it was found that the inside temperature was 4° C. lower than that of a car with no film sheet put on the windows.

EXAMPLE 9

A photosensitive solution consiting of 100 parts of a styrene-monoisobutyl maleate copolymer, 50 parts of trimethylolpropane triacrylate, 8 parts of 3,3',4,4'-tetra(t-butylperoxycarbonyl)benzophenone, 1 part of 3,3'-carbonylbis(7-diethylaminocumarin) and 1,000 parts of dioxane was applied on a 3-mm thick, 20 cm·20 cm glass by means of an applicator, and then dried to obtain a 20 μm film, on which 10 wt. % of polyvinyl alcohol was spin-coated to form an overcoat layer. As in Example 8, light-blocking plates, index matching solutions and glass blocks were laminated on the film for exposure at 8 mJ/cm². Then, the procedure of Example 8 was followed, using different light-blocking plates and glass blocks, followed by removal of the glass blocks, index matching solutions, light-blocking plates and overcoat layer. After this, the film sheet was dipped in ethylene glycol monoethyl ether for development and swelling. By measurement, this film sheet was found to show diffraction gratings at 1,100 nm and 1,350 nm with a diffraction efficiency of 90%. Here, too, this film sheet, when estimated on a car, was found to have similar effects.

Thus, a heat-wave reflecting film having a wide range of diffraction wavelengths could be easily produced with high visible light transmission properties due to wavelength selectivity making use of diffraction. The heat-wave reflecting film obtained according to the invention, when put on the windows of a car or building, makes it possible to lower the inside temperature.

Figure 29:
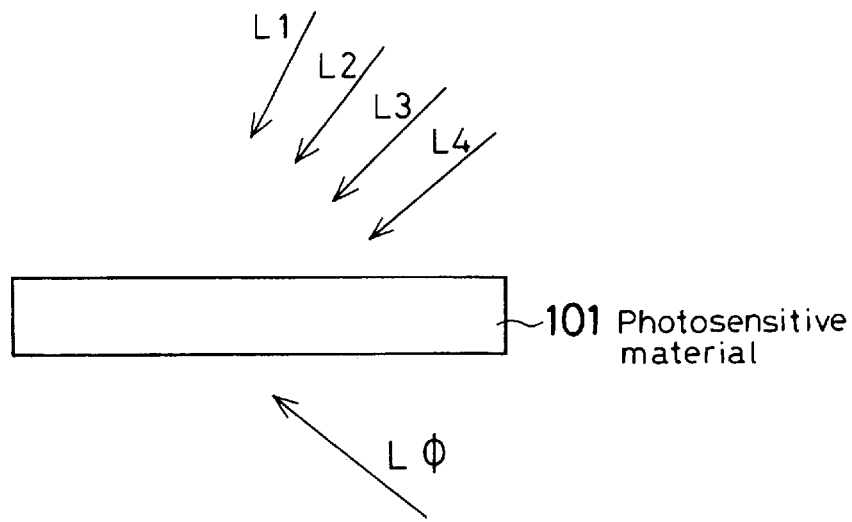
FIG. 29 is a schematic of how to produce a holographic filter according to the invention.
Figure 30:
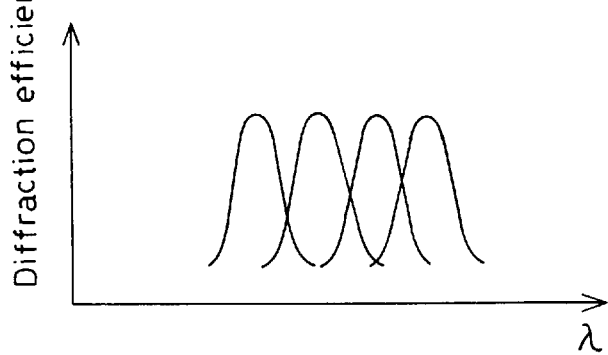
FIG. 30 is a schematic of the diffraction efficiency characteristics of a filter according to the invention.

FIG. 29 is a schematic that represents how to produce the holographic optical element according to the invention. Upon light beams L1, L2, L3 and L4 with varying directions of incidence striking a photosensitive material 101 and a light beam L0 striking the opposite side thereof, interference fringes with a pitch varying dependent on the angle made between the light beams are recorded. As a result, characteristics with varying peak wavelengths and a plurality of diffraction efficiencies superposed on each other are obtained, as shown in FIG. 30. Moreover, there is an increase in the diffraction efficiency with respect to a given wavelength region, so that the reflection characteristics with respect to light in this wavelength region can be improved, thus enabling a band cut optical filter to be easily produced.

Figure 31:
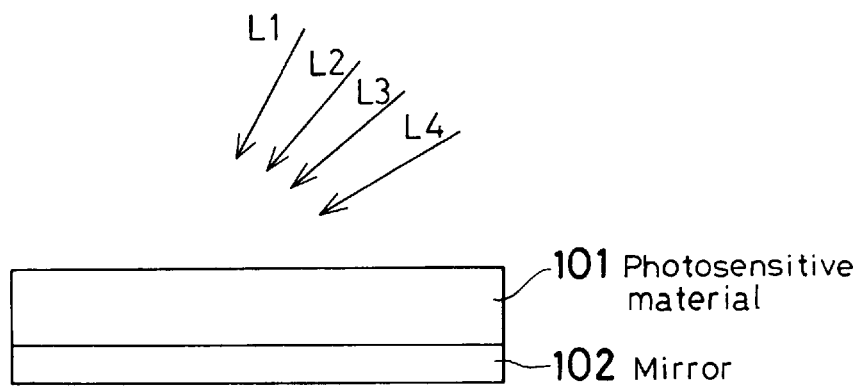
FIG. 31 is a schematic of how to produce a holographic filter having a mirror in close contact with its back side.

Alternatively, a plurality of light beams L1, L2, L3 and L4 with varying directions of incidence may fall on one side of a photosensitive material 101, while a mirror 102 is in close contact with the opposite side thereof, thereby recording interference fringes, as shown in FIG. 31.

Figure 32:
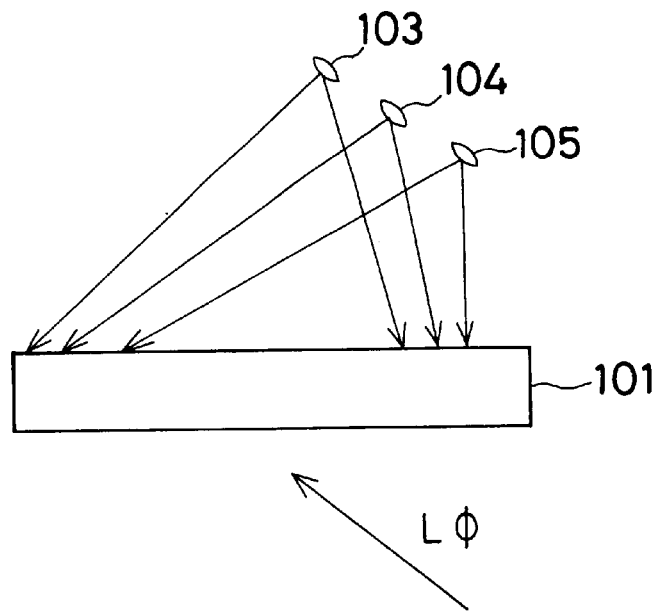
FIG. 32 is a schematic of how to produce a holographic filter by means of a plurality of point sources.

FIG. 32 represents how to record interference fringes by a plurality of divergent point sources 103, 104 and 105 and, as illustrated, interference fringes with a pitch depending on a difference in the angles in the respective directions of incidence are recorded. Here, too, a mirror may be brought in close contact with the opposite side of the photosensitive material instead of using the light beam L0.

Still alternatively, a lens may be located between the light sources and the photosensitive material.

Still alternatively, interference fringes may be recorded with one point source and a plurality of lenses.

Figure 33:
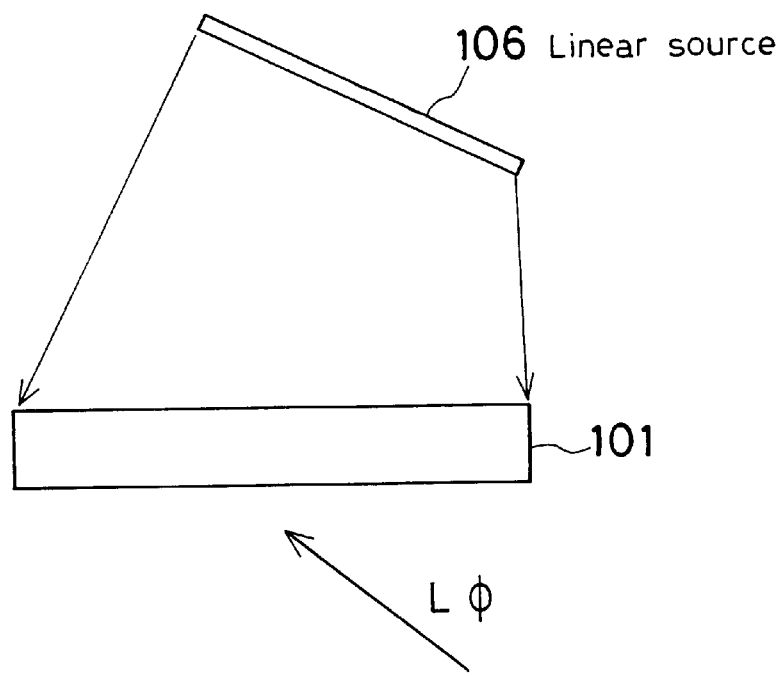
FIG. 33 is a schematic of how to produce a holographic filter by means of a linear source.

FIG. 33 represents how to record interference fringes with a continuously changing pitch and, as illustrated, a photosensitive material 101 is illuminated by light from a linear source 106. In this case, the light incident on the photosensitive material 101 changes direction continuously, and so the pitch of the interference fringes recorded changes continuously, so that a broad band of holographic filter can be produced. Here, too, it is of course that a mirror may be brought into close contact with the opposite side of the photosensitive material instead of using the light beam L0.

EXAMPLE 10

A mirror was put on the back side of a 40-μm thick Omnidex 352 (made by Du Pont) for multiple exposure by (514 nm) argon laser. To this end, the recording film was first illuminated at an intensity of 1 mW/cm$^2$ and an angle of 30° with respect to the normal line for 30 seconds. Then, it was irradiated at an intensity of 1 mW/cm$^2$ and at an angle of 50° with respect to the normal line for 30 seconds. After this, xylene was added dropwise to the recording film, followed by the provision of a quartz glass prism thereon. The recording film was then irradiated at an intensity of 1 mw/cm$^2$ and an angle of 70° with respect to the normal line for 50 seconds, after which the film was irradiated all over the surface at a 365 nm wavelength and 200 mj/cm$^2$ with the use of an ultra-high-pressure mercury lamp (made by Fusion Co., Ltd.), followed by a two-hour heating at 120° C. The recording film was measured in terms of transmittance with the use of a double monochromator spectrophotometer UV-365 made by Shimadzu Corporation. As a result, a diffraction grating was obtained, which was found to have peaks at three wavelengths 600 nm, 800 nm and 1,500 nm.

Thus, it is possible to easily record interference fringes with a varying pitch with the use of an optical system, and so it is possible to easily produce a broad band of holographic optical filter.

The diffraction grating with a wider range of diffraction wavelengths will now be explained.

When polymers different from each other in terms of the degree of swelling with respect to a developer are simultaneously used as the binder polymer of the photopolymer in the photosensitive layer, the degree of swelling of the photopolymer due to the developer differs from site to site. To avoid this, a developer in which a monomer different from that in the photopolymer is dissolved is used after recording by light interference, whereby the unreacted monomer in the photosensitive layer is substituted by the monomer in the developer in the process of swelling. This causes the proportion of the monomer to be substituted and hence the index of refraction to differ from site to site, and so the optical distance between the interference fringes to differ from site to site, enabling the diffraction wavelength range to become wider.

For instance, when there are a high swelling portion 111 and a low swelling portion 112, as shown in FIG. 34(*a*), all pitches d are the same in the state shown in FIG. 34(*b*), where the interference fringes are recorded by exposure. Upon development, however, the pitches d' and d" of the high and low swelling portions 111 and 112 shown in FIG. 34(*c*) have the following relations:

d'>d d"<d'

It is here noted that the pitches d, d' and d" of the interference fringes vary depending on the degree of swelling, and, with this, the reconstruction wavelength varies. Hence, d=λ/2n·sin θ where λ is the reconstruction wavelength, n is the index of refraction, and θ is the angle of incidence.

Figure 35:
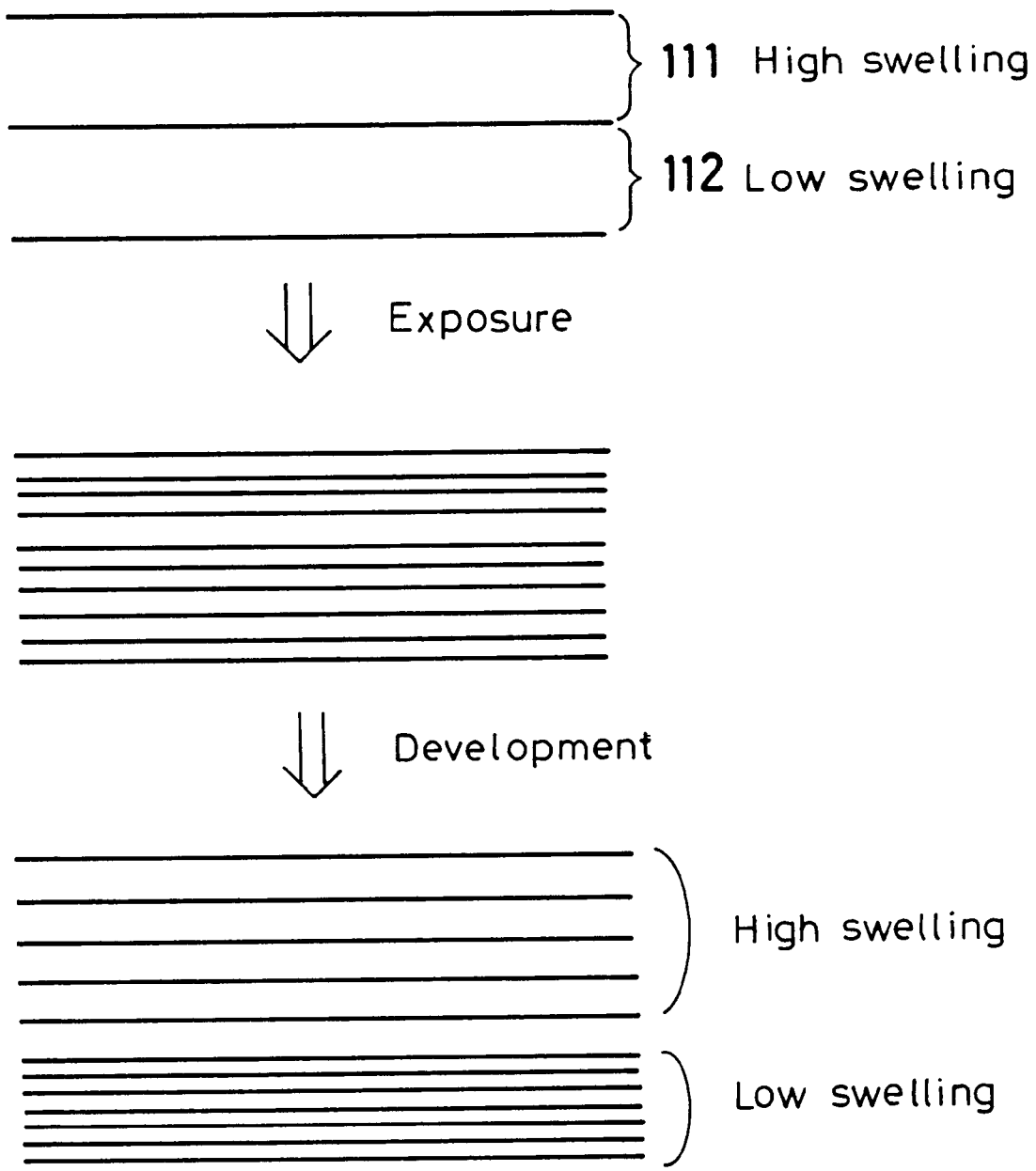
FIG. 35 is a schematic of an example of laminating different swelling photopolymers, thereby making the diffraction wavelength region wide.

When interference fringes are recorded while high and low swelling portions 111 and 112 are laminated together, as shown in FIG. 35, all interference fringe pitches d are the same in the recorded state. Upon development, however, the pitch d' of the upper high swelling portion has the relation d'>d, while the pitch d" of the lower low swelling portion has the relation d"<d'.

Therefore, by use of several binder polymers is it possible to make the diffraction wavelength region wider. For instance, this is useful for application to heat-wave reflecting films, etc.

More illustratively, the binder polymers used may include polymethacrylate ester or its partial hydrolyzed product, polyvinyl acetate or its hydrolyzed product, polystyrene, polyvinyl butyral, polychloroprene, polyvinyl chloride, chlorinated polyethylene, chlorinated polypropylene, poly-N-vinyl carbazole or its derivative, poly-N-vinyl pyrrolidone or its derivative, styrene-maleic anhydride copolymer or its half ester, copolymers obtained by the polymerization of a monomer selected from the group consisting of acrylic acid, acrylic ester, methacrylic acid, methacrylic ester, acrylamide and acrylnitrile, and so on.

The monomers used may include light-polymerizable or crosslinkable monomers having at least one ethylenically unsaturated double bond per molecule, their oligomers or prepolymers, or mixtures thereof. Examples of the monomer and its copolymer are an unsaturated carboxylic acid or its salt, an ester of an unsaturated carboxylic acid with an aliphatic polyhydric alcohol compound, an amide of an unsaturated carboxylic acid with an aliphatic polyhydric amine compound, and so on.

Some binder polymers with varying swelling properties with respect to the developer may be selected from the above binder polymers, and may be combined together for use. The selection of the polymers is efficiently achieved by calculating the solubility thereof, since the ability of them to swell in the developer has a close relation to the solubility of them.

By calculation, the solubility parameter δ representing solubility is found from the following equation developed by Fedors:

$$\delta = (\Sigma \Delta e_i / \Sigma \Delta v_i)^{1/2}$$

where $\Delta e_i$ and $\Sigma \Delta v_i$ are the evaporation energy and molar volume of the atom or atomic group, respectively. For instance, a δ value for n-butyl polymethacrylate is, by calculation, found to be 9.54.

More specifically and by way of example alone, a mixture of poly-N-vinyl carbazole (δ=12.4), a styrene-isobutyl maleate copolymer (δ=11.8) and polymethyl methacrylate (δ=10.0) is used together with a mixed solvent of acetone and ethyl cellosolve for development.

Similar effects are achievable with a mixture of some binder polymers that are similar or analogous to each other in terms of structure but have different weight-average molecular weights.

For instance, styrene-monoisobutyl maleate copolymers having weight-average molecular weights of a few thousand, tens of thousands and tens of ten thousands may combined together for use.

For the reactive monomers to be substituted, combinations of monomers differing largely in terms of the index of refraction may be selected.

For photopolymerization initiators and sensitizing dyes that are additional components, use may be made of those ordinarily used in the art.

By exposing a photosensitive layer containing these components to laser interference light and developing it, it is possible to obtain a diffraction grating having a wide range of diffraction wavelengths.

That is, the diffraction grating having a wide range of diffraction wavelengths, which is made up of a distributed index type of interference fringes recorded on a photopolymer according to the invention, is characterized in that the binder polymer used comprises a mixture of a plurality of polymers differing in terms of the degree of swelling with respect to a developer.

Also, the method for producing a diffraction grating having a wide range of diffraction wavelengths, which is made up of a distributed index type of interference fringes recorded on a photopolymer according to the invention, is characterized in that the interference fringes are recorded on a recording material obtained by dispersing a reactive monomer and a photopolymerization initiator in a binder polymer comprising a mixture of a plurality of polymers differing in terms of the degree of swelling with respect to a developer, and the recording material is then developed with a developer in which a reactive monomer different from the reactive monomer in the recording material is dissolved.

In this case, the polymers used may be different from each other in terms of solubility, or may be similar to each other in terms of structure but have different molecular weights. Alternatively, they may be different from each other in terms of structure as well as in terms of the rate of swelling with respect to the developer.

EXAMPLE 11

Dissolved in dioxane were a total of 50 parts of poly-N-vinyl carbazole, styrene-isobutyl maleate copolymer and styrene-acrylic acid copolymer as the binder polymers, 45 parts of tribromophenoxyethyl acrylate as the reactive monomer, 3 parts of benzophenone as the photopolymerization initiator and 2 parts of 3,3'-carbonylbis(7-diethylaminocumarin) as the sensitizing dye, thereby preparing a 10 wt. % photosensitive solution.

This photosensitive solution was applied on a glass sheet with the use of an applicator, and then dried to form a 20-μm thick film.

Coated on this film was 10 wt. % of polyvinyl alcohol (PVA 205 made by Kuraray Co., Ltd.) to form an oxygen barrier layer.

Then, this recording medium was exposed to 488 nm argon ion laser light by the two-beam interference technique.

Subsequently, the oxygen barrier layer was released off with the use of an adhesive tape.

The recording medium was then dipped for 30 seconds in a developer obtained by dissolving 50 wt. % of hydroxyethyl acrylate in a 1:1 solution of acetone and ethyl cellosolve for the extraction of the unexposed tribromophenoxyethyl acrylate, and hydroxyethyl acrylate was injected into the swollen binder polymers.

After this, the recording material was irradiated with ultraviolet rays at 1 J/cm$^2$ with the use of an ultra-high-pressure mercury lamp, thereby curing the injected hydroxyethyl acrylate.

The thus obtained diffraction grating was found to diffract light of 470 nm to about 650 nm.

It is noted that, to enlarge the diffraction wavelength range to a few 100 nm, a plurality of diffraction gratings produced as mentioned above, each having a different diffraction wavelength region, may be laminated together.

EXAMPLE 12

Provided for the binder polymers was a mixture of the following six styrene-maleic acid copolymers having different weight-average molecular weights (Mw):

Mw=1,700 (SMA17352)
Mw=1,900 (SMA2625)
Mw=2,300 (SMA3840)
Mw=2,500 (SMA1440)
Mw=105,000 (SCR1PSET550)
Mw=180,000 (SCR1PSET540)

The reactive monomer, photopolymerization initiator and sensitizing dye used were the same as in Example 11. A photosensitive solution comprising these ingredients was likewise coated and dried, and an oxygen barrier layer was then likewise formed. The obtained recording medium was likewise exposed to light.

Following removal of the oxygen barrier layer, the recording medium was dipped for 30 seconds in a developer obtained by dissolving 30 wt. % of Biscoat 17F (a flourine-containing acrylate made by Osaka Organic Chemical Co., Ltd) in a 1:1 solution of isopropyl alcohol and ethyl cellosolve for development.

After this, the recording medium was irradiated with ultraviolet rays at 1 J/cm$^2$ from an ultra-high-pressure mercury lamp to cure the injected Biscoat 17F.

The thus obtained diffraction grating was found to diffract light of 550 nm to about 680 nm.

It is noted that, to enlarge the diffraction wavelength range to a few 100 nm, a plurality of diffraction gratings as mentioned above, each having a different diffraction wavelength region, may be laminated together.

Comparative Example

Example 12 was followed with the exception that only SMA1440 with Mw=2,500 was used as the binder polymer. However, the width of the diffraction wavelength region was as narrow as about 20 nm.

According to the invention, the binder polymer for the photopolymer is made up of a plurality of polymers having different swelling properties with respect to the developer, as mentioned above. Thus, as the recording medium is developed with a developer in which a reactive monomer different from the reactive monomer therein is dissolved, the unreacted reactive monomer in the recording material is substituted by the reactive monomer in the developer, making the proportion of the monomer substituted and hence the index of refraction different from site to site. Hence, the optical distance between the interference fringes differs from site to site, thereby enabling the diffraction wavelength range to be made wider.

With the diffraction wavelength range set at 800 to 2,000 nm, it is possible to obtain a satisfactory heat-wave reflecting film that transmits visible light but reflects heat waves. This heat-wave reflecting film, when put on the windows of a car or building, makes it possible to reduce a rise in the inside temperature.

Another illustrative embodiment of the diffraction grating with a widened diffraction wavelength range will now be explained.

Figure 36:
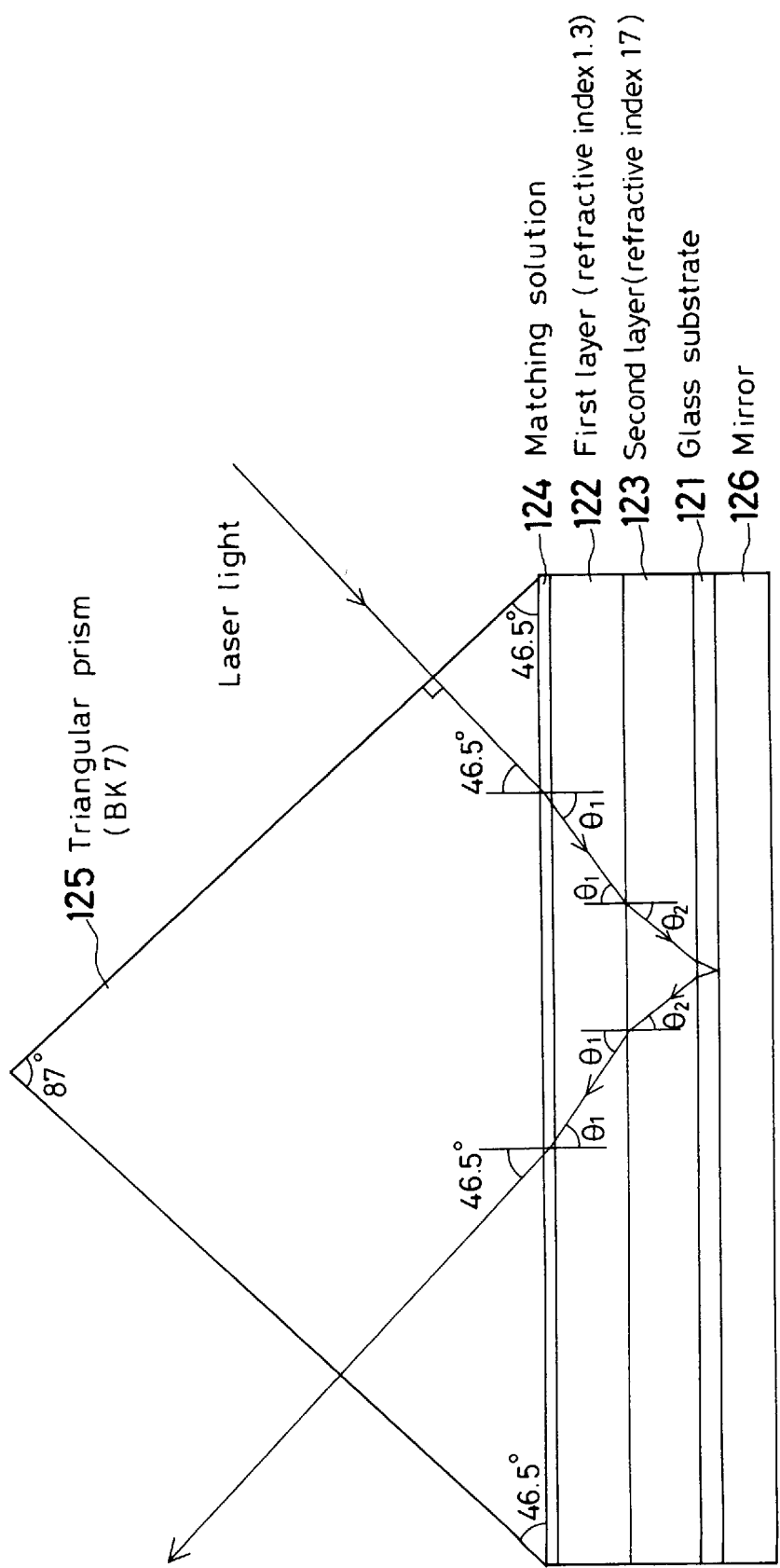
FIG. 36 is a schematic of another example of the diffraction grating with a wider diffraction wavelength range.

Referring to FIG. 36, hologram sensitive material layers 122 and 123 are formed on a glass substrate 121 to form a photosensitive sheet. A triangular prism 125 is located on this sheet through a matching solution 124, while a mirror 126 is brought into close contact with the lower side of the glass substrate 121. The triangular prism 125 located at the uppermost position is to allow laser light to be efficiently incident on the first photosensitive material layer 122 without causing any considerable refraction. The light incident on the first layer 122 ($n_1$=1.3) at an angle $\theta_1$ (of about 57.4°) with respect to the normal direction travels through the first layer, is refracted between the first layer 122 and the underlying second layer 123 ($n_2$=1.7), and enters and travels through the second layer 123 at an angle $\theta_2$ (of about 40.1°) with respect to the normal direction. Then, the light passes through the glass substrate 121 and reaches the interface between the glass substrate 121 and the mirror 126, from which the light is reflected and, as shown, travels back through the second and first layers 123 and 122 at the same angle for the incident light. In this course, the light traveling to the mirror and the light reflected by the mirror interfere with each other in the respective layers 122 and 123 to produce parallel interference fringes parallel in the respective layers. The thus produced interference fringes, when light falls vertically on them, reflect light having a specific wavelength in dependence on the fringe spacing and the indices of refraction. In other words, the diffraction wavelength regions in the respective layers 122 and 123 are different from each other.

To explain this briefly, now let n denote the index of refraction of the recording material and d represent the interference fringe spacing and assume that light, with the wavelength in vacuum represented by $\lambda$, travels through the recording material at the same angle $\theta$ with respect to the normal line and in the opposite direction. Then, the Bragg condition takes the form $$2nd \sin (\pi/2-\theta) = \lambda \quad (3)$$

Hence, in the first layer 122, $$2n_1 d_1 \sin (\pi/2-\theta_1) = \lambda \quad (4)$$

and in the second layer 123, $$2n_2 d_2 \sin (\pi/2-\theta_2) = \lambda \quad (5)$$

Snell's law, on the other hand, can be written $$n_1 \sin \theta_1 = n_2 \sin \theta_2 \quad (6)$$

Eqs. (4) to (6) can be applied to determining the spacings $d_1$ and $d_2$ of the interference fringes recorded in the respective layers 122 and 123. Based on the thus determined spacings, the reflection wavelengths $\lambda_1$ and $\lambda_2$ in the case of vertical incidence ($\theta=0$) are then given by Eq. (3). In general, the wavelengths $\lambda_1$ and $\lambda_2$ differ from each other, if $n_1 \neq n_2$ and $q_1 \neq 0$. By arbitrary selection of the wavelength $\lambda$ of the recording laser light, the refractive indices $n_1$ and $n_2$ of the material layers 122 and 123 sensitive to that laser light, and the angle $\theta_1$ of incidence of the laser light, it is possible to select the range of the wavelength to be diffracted and hence widen the diffraction wavelength region. Further, by increasing the number of the photosensitive material layers is it possible to make the diffraction wavelength range much wider.

Figure 37:
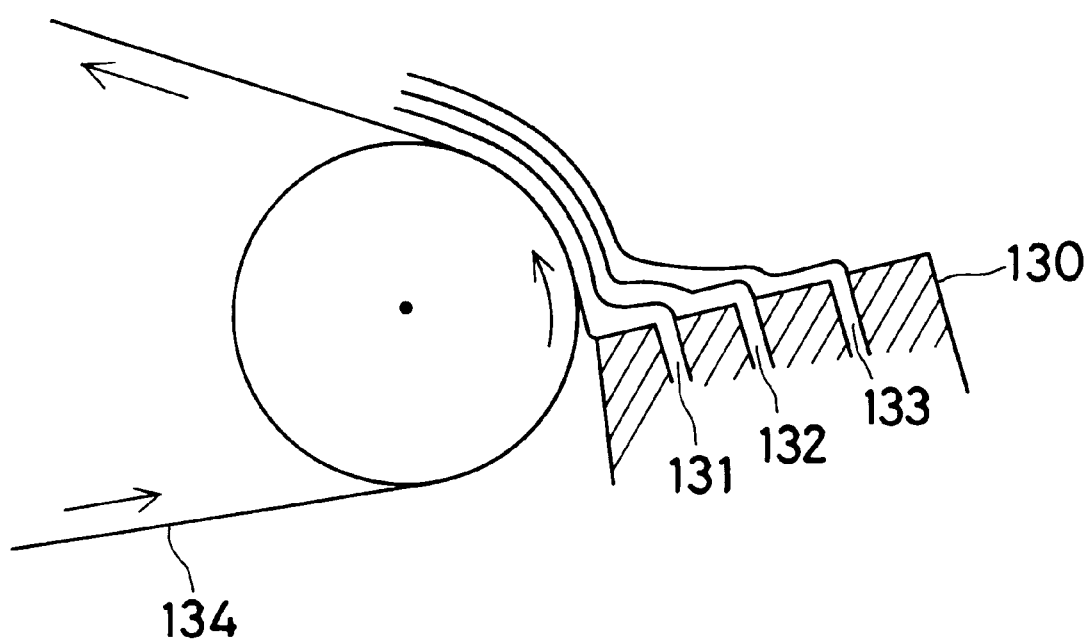
FIG. 37 is a schematic of a slide coater arrangement.
Figure 38:
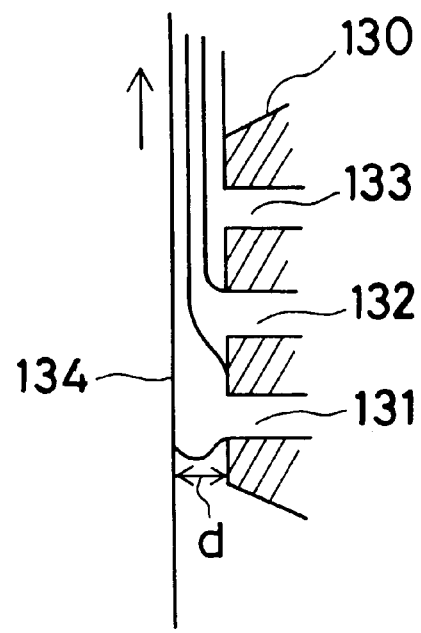
FIG. 38 is a schematic of a slot coater arrangement.
Figure 39:
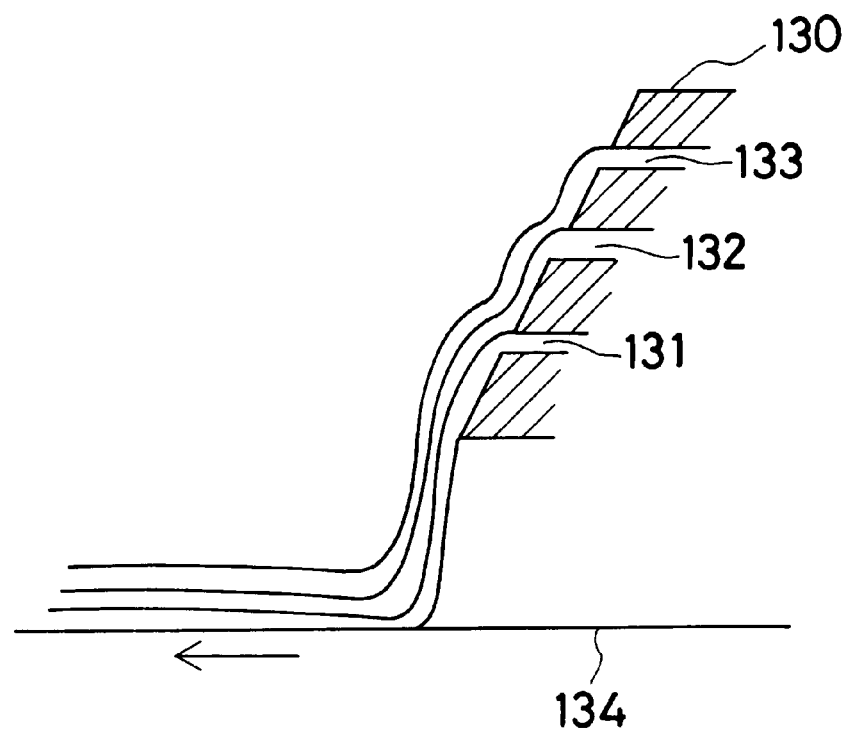
FIG. 39 is a schematic of a curtain coater arrangement.

It is noted that to coat the layers of hologram sensitive materials having different refractive indices on a plurality of base films, coaters such as those shown in FIGS. 37 to 39 may be used. FIG. 37 represents a slide coater, FIG. 38 a slot coater, and FIG. 39 a curtain coater, each enabling a plurality of layers to be coated at the same time without giving rise to any increase in the number of the steps involved. The coaters shown in FIGS. 37 to 39 will now be explained briefly. In each coater, the distal end of a nozzle 130 having a plurality of slits 131 to 133, through which the materials for the respective layers are extruded, is located in the illustrated configuration for the film 134 to be coated. Each of the slide and curtain coaters shown in FIGS. 37 and 39 is designed to produce a multi-layer flow prior to coating and then coat it on the film 134, and so is suitable for coating a solution of low viscosity. In the former case the distance between the nozzle and the film 134 is as small as 1 mm or less, and in the latter case the nozzle may be spaced a few cm-away from the film 134. The slot coater shown in FIG. 38 is designed to coat a plurality of layers on the film 134 in order from the lowermost layer, and so lends itself fit for coating a solution of high viscosity. Film thickness control may be achieved by the amounts of the solutions extruded through the slits 131 to 133 in the cases shown in FIGS. 37 and 39, and by the distance d between the film 134 and the nozzle 130 in the case shown in FIG. 38.

As can be appreciated from what has been described, the method for producing a diffraction grating with a wider diffraction wavelength range according to the invention is characterized in that a photosensitive medium made up of a plurality of hologram sensitive material layers having different refractive indices in the thickness direction is provided, and light is allowed to strike diagonally both sides of the photosensitive medium to record interference fringes substantially parallel with the respective layers.

According to the invention, it is practical that the interference fringes are recorded by allowing light to fall diagonally on one side of the photosensitive medium while a reflector mirror is located on the other side. More practically, the interference fringes can be recorded with a higher efficiency, if light is incident on the face of the short side of the triangular prism, while the face of the long side is brought into close contact with the other side of the photosensitive medium.

EXAMPLE 13

The triangular prism 125 shown in FIG. 36 is made up of glass BK7 (with a refractive index of 1.51). This triangular prism takes an isosceles triangle form with a base angle of 46.5°. Parallel laser beams (647.1 nm krypton laser light) are incident vertically on the face of one short side of this isosceles triangle. The prism 125 and the photosensitive material are brought into close contact with each other with the matching solution 124 between them. The laser light passing through the triangular prism 125 falls on the first layer 122 at an angle of 57.4° with respect to the normal direction. The light is then refracted and falls on the second layer 123 at an angle of 40.1° with respect to the normal direction. The light passing through the second layer 123 strike the mirror 126 in close contact therewith through the matching solution, and is reflected thereby. The reflected light travels back through the second layer 123 at an angle of 40.1°. Further, the light is again refracted and travels back through the first layer 122 at an angle of 57.4° and then through the prism 125. At this time, the light traveling to the mirror 126 and the light reflected by the mirror 125 interfere with each other in the photosensitive materials 122 and 123 to produce interference fringes parallel with the respective layers. The then interference fringe spacing may be found by the following calculation.

The angle $\theta_1$, at which the krypton laser light traveling through the prism 125 (with a refractive index of 1.51) at an angle of 46.5° is incident on the first layer (having a refractive index of 1.3), is given by Eq. (4), i.e., $$1.51 \times \sin 46.5° = 1.3 \times \sin \theta_1$$

$$\theta_1 = 57.4°$$

The spaing $d_1$ of the interference fringes produced by the light incident at this angle $\theta_1 = 57.4°$ is given by Eq. (2), i.e., $$2 \times 1.3 \times d_1 \times \sin (90-57.4) = 647.1$$

$$d_1 = 462 \text{ nm}$$

The actually reflected center wavelength $\lambda_1$ is found by substituting n=1.3, d=462 and $\theta=0$ for Eq. (3), i.e., $$\lambda_1 = 1,201 \text{ nm}$$

Similarly, the laser light is incident on the second layer 123 (having a refractive index of 1.7) at an angle of 40.1° with an interference fringe spacing $d_2$ of 249 nm. At this time, the actually reflected center wavelength $\lambda_2$ takes a value of 846 nm.

Practically, three layers of photopolymer materials having refractive indices varying between 1.3 and 1.7 were coated on a glass substrate for image-taking, while they were superposed on each other. A diffraction grating produced from the recording material according to the above procedure was found to cut off heat waves of 800 to 1,250 nm.

It is noted that the above example may be modified such that the laser light is split as by a half-mirror into two beams, which are then allowed to fall on both sides of the multilayer photosensitive material at the same angle of incidence for recording interference fringes.

According to the invention, a photosensitive medium made up of a plurality of hologram sensitive material layers having different refractive indices in the thickness direction is provided, and light is allowed to strike diagonally both sides of the photosensitive medium to record interference fringes substantially parallel with the respective layers. Thus, the interference fringes recorded on the respective layers differ from each other in terms of the diffraction wavelength of vertical incidence, so that a diffraction grating with an overall wide diffraction wavelength range can be produced.

A further illustrative embodiment of the diffraction grating according to the invention will now be explained.

The diffraction grating according to this embodiment is made up of volume hologram interference fringes, and has plural sets of interference fringes of different pitches recorded thereon at the same time. The respective sets of interference fringes are of so different pitches that the diffraction and reflection wavelengths can differ. This enables the overall diffraction grating to have a wide diffraction wavelength range. It is desired, however, that the respective sets of interference fringes be produced parallel with the surface of the photosensitive material.

Such a diffraction grating may be produced by multiple interference exposure using a plurality of light beams different in terms of the wavelength incident on the photosensitive material.

The diffraction grating according to the instant embodiment will now be explained more specifically. When a diffraction grating having a widened diffraction wavelength region is produced by a limited number of exposure wavelengths, some portion is reduced in terms of diffraction efficiency, although this depends on wavelength. Diffraction efficiency η is found by the following equation (7). Alternatively, diffraction efficiency η is measured by a spectrophotometer, and the wavelength interval best suited for diffraction grating production by multiple exposure is determined in view of the relation of wavelength to the thus found diffraction efficiency. For instance, multiple exposure may be done at that wavelength interval, using a dye laser.

$$\eta = v^2/\{v^2 + (v^2-\xi^2)/\sin h^2(v^2-\xi^2)^{1/2}\} \quad (7)$$

where $$v = i\pi\Delta nT/\{\lambda_c(\cos\theta_c \cos\theta_i)^{1/2}\}$$

$$\xi = \pi T\{n_c(\cos\theta_c - \cos\theta_i)/\lambda_c - n_o(\cos\theta_r - \cos\theta_o)/\lambda_o\}$$

Here, Δn is the half-value of a refractive index change in the interference fringes, T is the hologram thickness, $\theta_c$ is the angle of illumination light during reconstruction, $\theta_i$ is the angle of diffraction light during reconstruction, $\theta_r$ is the angle of reference light during recording, $\theta_o$ is the angle of object light during recording, $\lambda_c$ is the reconstruction wavelength, and $\lambda_o$ is the recording wavelength.

To shift the diffraction wavelength range to a wavelength longer than that in the taking wavelength range, it is required that image-taking be done at a small angle of incidence. However, it is impossible for laser light to strike a photosensitive material having a high refractive index at an angle of incidence larger than the critical angle. In that case, laser light may be incident at any desired angle on the photosensitive material, while a glass block is brought into close contact with the photosensitive material. It is thus possible to produce a diffraction grating that can diffract light of longer wavelength in reconstructing it by vertical incidence.

Figure 40:
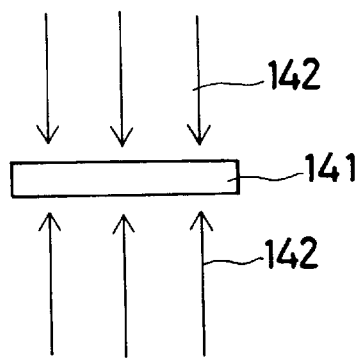
FIG. 40 is a schematic of still another example of the diffraction grating with a wider diffraction wavelength range.
Figure 41:
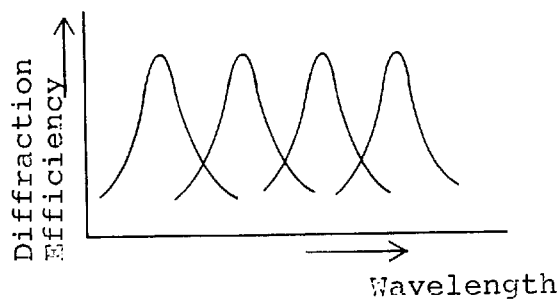
FIG. 41 is a schematic of the diffraction efficiency characteristics of a diffraction grating produced according to the invention.

How to produce the diffraction grating will now be explained more illustratively with reference to FIGS. 40 to 43. Referring first to FIG. 40 that represents how to produce the diffraction grating according to the instant embodiment, a photosensitive material 141 is subjected to multiple interference exposure using two light beams 142 and 143, thereby recording interference fringes of pitches depending on the exposure wavelength. As a result, diffraction efficiency properties with a plurality of superposed diffraction wavelength regions are achievable, as shown in FIG. 41. It is thus possible to easily obtain a diffraction grating that shows a large diffraction efficiency in a given wavelength range, improves reflectivity with respect to light in this wavelength region, and has a wide diffraction wavelength range.

Figure 42:
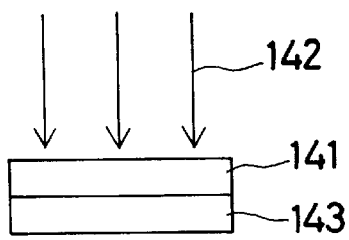
FIG. 42 is a schematic of another production method.

FIG. 42 represents another example of producing the diffraction grating. A plurality of light beams 142 having different wavelengths, as mentioned above, are allowed to be incident on a photosensitive material 141 while a mirror 143 is brought into close contact with the back side thereof, whereby the incident light and the light reflected from the mirror 143 interfere with each other, making a multiple recording of the interference fringes.

Figure 43:
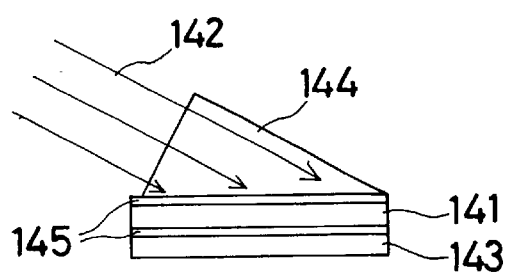
FIG. 43 is a schematic of a production method making use of a glass block.

FIG. 43 represents an example of producing a diffraction grating with a mirror 143 into close contact with the back side of a photosensitive material 141 and a glass block 144 in close contact with the surface side. More specifically, the glass block 144 is brought into close contact with the photosensitive material 141 through a matching solution 145, while the mirror 143 is in close contact with the back side. By allowing a plurality of light beams 142 having different wavelengths to be incident on the photosensitive material 141 is it possible to obtain a diffraction grating having diffraction characteristics in a longer wavelength region.

As can be understood from what has been explained above, the process of producing a diffraction grating having a wide diffraction wavelength range, on which a plurality of interference fringes having different pitches are recorded according to the invention, is characterized in that the interference fringes are recorded on a photosensitive material by multiple interference exposure using a plurality of light beams having different wavelengths.

Using a dye laser as the light source, the recording material is subjected to multiple exposure using a plurality of light beams with the wavelength interval of up to 50 nm, whereby high diffraction efficiency is similarly achievable at any wavelength in the diffraction wavelength region.

Such a diffraction grating can be easily produced by reflecting incident light from the back side of a photosensitive material while a reflecting mirror is located on the side of the photosensitive material opposite to the incident side thereof, thereby recording interference fringes produced by the interference of the incident light and the reflected light.

In this case, if a transparent block is brought into close contact with the incident side of the photosensitive material such that the incident light can strike the photosensitive material through the transparent block, it is possible to obtain a diffraction grating having diffraction characteristics in a longer wavelength region.

EXAMPLE 14

A 20-μm thick photosensitive film of Omnidex 352 (made by De Pont) was used. Laser light from a dye laser used as a light source was split into parallel two light beams, which were then allowed to fall vertically on the photosensitive film for quadruple exposure at an increment of 30 nm from 450 nm to 540 nm. Interference fringes were produced at the exposures of 3, 4, 5 and 6 mJ/cm$^2$. Following this, the photosensitive film was post-baked at 120° C. for 1 hour. As a result, a diffraction grating having a diffraction wavelength region of 100 nm or more could be produced.

EXAMPLE 15

A 20-μm thick photosensitive film of Omnidex 352 (made by De Pont) was used. A glass block and mirror for allowing light to be incident thereon at an angle of 60° are brought into close contact with the film, using xylene as a matching solution. Using a dye laser as a light source, the film was subjected to quadruple exposure at an incremental of 25 nm from 450 nm to 525 nm. Interference fringes were produced at the exposures of 3, 4, 5 and 6 mJ/cm$^2$. Following this, the photosensitive film was post-baked at 120° C. for 1 hour. As a result, a diffraction grating having a 900 nm to 1,100 nm diffraction wavelength region could be produced.

Thus, since the interference fringes are recorded on the photosensitive material by multiple interference exposure using a plurality of light beams having different wavelengths, it is possible to produce a diffraction grating having a wide diffraction wavelength region. With the diffraction wavelength range set at 900 to 1,100 nm, it is possible to obtain a satisfactory heat-wave reflecting film that transmits visible light but reflects light in the infrared region.

What we claim is:

1. A holographic optical element that diffracts at least two types of light, characterized in that volume phase hologram diffraction gratings, each diffracting light of a different wavelength corresponding to one of said at least two types of light, are distributed in the planar direction in different areas on the same surface of said holographic optical element in the form of sets of interference fringes that are independent in the thickness direction of the holographic optical element, said different areas having had differing spectral sensitivity.

2. A holographic optical element according to claim 1, characterized in that the independent sets of interference fringes are formed in dotted or striped configuration, the size of which is 200 μm or less.

3. A holographic optical element according to claim 1, characterized in that the independent sets of interference fringes are formed in dotted or striped configuration, the size of which is at least twice as large as the thickness of the sensitive material layers.

4. A holographic optical element according to any one of claims 1 to 3, which is a hologram combiner or display hologram.

5. A holographic optical element according to claim 1 wherein the volume phase hologram is a Lippman hologram.

6. A holographic optical element according to claim 1 wherein the volume phase hologram is a transmission type hologram.

7. A holographic optical element, characterized in that it has a high transmittance for visible light and is formed such that a plurality of sites reflecting different regions are distributed in the planar direction in different areas on the same surface of said holographic optical element each of, said sites being sets of interference fringes forming a volume phase hologram that are independent in the thickness direction of the holographic optical element, such that the transmittance of heat waves having a wavelength of 800 nm or larger is lowered, said different areas having had differing spectral sensitivity.

8. A holographic optical element according to claim 7, characterized in that the plurality of sites reflecting different wavelength regions are arranged in mosaic configuration.

9. A holographic optical element according to claim 7 or 8, characterized in that diffraction gratings with different grating spacings are formed on the sites reflecting different wavelength regions.

10. A holographic optical element with interference fringes recorded thereon, characterized in that volume phase hologram diffraction gratings in the form of sets of interference fringes of a plurality of different pitches are distributed in the planar direction in different areas on the same surface of said holographic optical element, and said sets of interference fringes are independent in the thickness direction of the holographic optical element, said different areas having had differing spectral sensitivity.

* * * * *